United States Patent
Peng et al.

(10) Patent No.: US 12,301,730 B2
(45) Date of Patent: May 13, 2025

(54) DATA VERIFICATION METHOD AND APPARATUS

(71) Applicant: SHENZHEN YINWANG INTELLIGENT TECHNOLOGIES CO., LTD., Shenzhen (CN)

(72) Inventors: Jianfen Peng, Beijing (CN); Zhipeng Guo, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 138 days.

(21) Appl. No.: 17/965,455

(22) Filed: Oct. 13, 2022

(65) Prior Publication Data

US 2023/0034996 A1 Feb. 2, 2023

Related U.S. Application Data

(63) Continuation of application No. PCT/CN2020/084981, filed on Apr. 15, 2020.

(51) Int. Cl.
*H04L 9/00* (2022.01)
*H04L 9/08* (2006.01)
*H04L 9/32* (2006.01)

(52) U.S. Cl.
CPC .......... *H04L 9/3263* (2013.01); *H04L 9/0825* (2013.01); *H04L 9/0869* (2013.01)

(58) Field of Classification Search
CPC ........ G06F 21/30; H04L 63/00; H04W 12/00; H04W 12/06
USPC ........................................................ 713/175
See application file for complete search history.

(56) References Cited

U.S. PATENT DOCUMENTS

| | | | |
|---|---|---|---|
| 2017/0111177 | A1 | 4/2017 | Oguma et al. |
| 2018/0212937 | A1* | 7/2018 | Wang ................ H04L 12/40104 |
| 2019/0028448 | A1 | 1/2019 | Farrell |
| 2019/0238555 | A1 | 8/2019 | Buffard et al. |
| 2020/0213287 | A1* | 7/2020 | Zhang .................. H04L 63/123 |
| 2022/0224684 | A1* | 7/2022 | Schultz ................ H04W 76/11 |

(Continued)

FOREIGN PATENT DOCUMENTS

| | | |
|---|---|---|
| CN | 108248532 A | 7/2018 |
| CN | 110515371 A | 11/2019 |
| EP | 3157203 A1 | 4/2017 |

(Continued)

OTHER PUBLICATIONS

Office Action in Chinese Appln. No. 202080005001.9, dated Aug. 26, 2021, 12 pages (with English translation).

(Continued)

*Primary Examiner* — Josnel Jeudy
(74) *Attorney, Agent, or Firm* — Fish & Richardson P.C.

(57) ABSTRACT

Example data verification methods and apparatus are described. One example method is applied to a first device in a vehicle, where the vehicle includes the first device and a second device. The first device receives a first message from the second device, where the first message includes first verification information, the first verification information is used to perform verification on first data, and the first data is configuration information of the second device that is stored in the second device. The first device performs verification on the first data based on configuration information of the second device that is stored in the first device and the first verification information.

20 Claims, 11 Drawing Sheets

(56) References Cited

U.S. PATENT DOCUMENTS

2024/0073028 A1\* 2/2024 Du .................. H04L 9/3247

FOREIGN PATENT DOCUMENTS

EP          3293659 A1     3/2018
WO       2019145488 A1     8/2019

OTHER PUBLICATIONS

Extended European Search Report in European Appln No. 20931614.0, dated Mar. 28, 2023, 9 pages.
International Search Report and Written Opinion in International Appln. No. PCT/CN2020/084981, mailed on Dec. 30, 2020, 17 pages (with English translation).

\* cited by examiner

DATA VERIFICATION METHOD AND APPARATUS

CROSS-REFERENCE TO RELATED APPLICATIONS

This application is a continuation of International Application No. PCT/CN2020/084981, filed on Apr. 15, 2020, the disclosure of which is hereby incorporated by reference in its entirety.

TECHNICAL FIELD

This application relates to the field of intelligent connected vehicle technologies, and in particular, to a data verification method and apparatus.

BACKGROUND

There is a plurality of in-vehicle devices in a vehicle, for example, an electronic control unit (ECU), a sensor, and a domain controller. The ECU can be applied to a self-driving vehicle. For example, an advanced driver-assistance system (ADAS) may make a driving decision by using information provided by an in-vehicle device such as an ECU or a sensor. The ADAS includes many sensors, for example, a camera, a millimeter-wave radar, an ultrasonic radar, or a LiDAR Data collected by these sensors may be transmitted to another in-vehicle device in the vehicle by using an in-vehicle network.

To implement functions between in-vehicle devices in a vehicle, static configuration needs to be performed on each in-vehicle device. After an in-vehicle device is installed, it needs to be ensured that configuration information of each in-vehicle device is not tampered with, to ensure vehicle security.

Currently, there is no relatively good solution for efficiently and conveniently performing security protection on the configuration information of the in-vehicle device.

SUMMARY

This application provides a data verification method and apparatus, to improve security of configuration information of an in-vehicle device in a vehicle.

According to a first aspect, this application provides a data verification method, where the method is applied to a vehicle, and the vehicle includes a first in-vehicle device and a second in-vehicle device. The method may be implemented on the first in-vehicle device, or may be implemented on a chip of the first in-vehicle device. For example, the first in-vehicle device receives a first message from the second in-vehicle device, where the first message includes first verification information, the first verification information is used to perform verification on first data, and the first data is configuration information of the second in-vehicle device that is stored in the second in-vehicle device. The first in-vehicle device performs verification on the first data based on configuration information of the second in-vehicle device that is stored in the first in-vehicle device and the first verification information.

According to the foregoing method, the first in-vehicle device stores the configuration information of the second in-vehicle device, so that the configuration information of the second in-vehicle device that is stored in the second in-vehicle device can be verified by using the first in-vehicle device. Therefore, efficient and secure verification is performed on the configuration information of the in-vehicle device in the vehicle, and no additional verification manner is executed, thereby reducing verification difficulty and improving security of the configuration information of the in-vehicle device in the vehicle.

In a possible implementation, the configuration information of the second in-vehicle device is related to a location or a function of the second in-vehicle device in the vehicle.

According to the foregoing method, the configuration information of the second in-vehicle device is related to the location or the function in the vehicle. For example, the configuration information of the second in-vehicle device may include a domain in which the second in-vehicle device is located. Further, in-vehicle devices at adjacent locations may be disposed in one domain. In addition to reducing harnesses between the in-vehicle devices, this reduces difficulty of data verification between the in-vehicle devices, and improves data verification efficiency.

In a possible implementation, the first message further includes first authentication information, the first authentication information is used to perform authentication on an identity of the second in-vehicle device, and the first authentication information is generated based on identity information of the second in-vehicle device. The first in-vehicle device performs authentication on the identity of the second in-vehicle device based on the first authentication information.

According to the foregoing method, before the first in-vehicle device performs verification on the first data, authentication is performed on the identity of the second in-vehicle device first. Verification is performed on the first data after it is ensured that the identity of the second in-vehicle device is valid, thereby improving data verification security and verification efficiency.

In a possible implementation, before the first in-vehicle device receives the first message from the second in-vehicle device, the method further includes: The first in-vehicle device receives a second message from the second in-vehicle device, where the second message includes the first authentication information, the first authentication information is used to authenticate the identity of the second in-vehicle device, and the first authentication information is generated based on the identity information of the second in-vehicle device. The first in-vehicle device determines, based on the first authentication information, that the identity of the second in-vehicle device is authenticated.

In a possible implementation, the vehicle further includes a third in-vehicle device, and the method further includes:

The first in-vehicle device determines that the first verification information is successfully verified.

The first in-vehicle device obtains a result of verification performed by the third in-vehicle device on the first data.

The first in-vehicle device determines, based on the result of verification performed by the third in-vehicle device on the first data, that the third in-vehicle device successfully verifies the first verification information.

According to the foregoing method, in a scenario in which a security risk may occur in the first in-vehicle device, the third in-vehicle device further performs verification on the first data, thereby improving validity of verification on the first data.

In a possible implementation, the vehicle further includes a third in-vehicle device, and the third in-vehicle device stores configuration information of the second device. The first in-vehicle device determines, based on a result of verification performed by the first in-vehicle device on the first data, that the first data fails to be verified by the first in-vehicle device. The first in-vehicle device obtains a result of verification performed by the third in-vehicle device on second data, where the second data is the configuration information of the second in-vehicle device that is stored in the first in-vehicle device. The first in-vehicle device determines, based on the result of verification performed by the third in-vehicle device on the second data, that the third in-vehicle device successfully verifies the second data. The first in-vehicle device determines, based on the fact that the second data is successfully verified by the third in-vehicle device and the first data fails to be verified by the first in-vehicle device, that the first data is abnormal.

According to the foregoing method, when the first data corresponding to the first in-vehicle device fails to be verified, a possible cause is that the second data stored in the first in-vehicle device is abnormal, or the first data stored in the second in-vehicle device is abnormal. Therefore, the first in-vehicle device may determine, based on the fact that the third in-vehicle device successfully verifies the second data and the first data corresponding to the first in-vehicle device fails to be verified, that the first data is abnormal. In this way, abnormal data can be effectively determined, which helps the vehicle perform corresponding processing on the abnormal data, thereby improving data verification security and fault tolerance of the configuration information of the in-vehicle device.

In a possible implementation, the vehicle further includes a third in-vehicle device, and the third in-vehicle device stores configuration information of the second device. The first in-vehicle device determines, based on the result of verification performed by the first in-vehicle device on the first data, that the first data fails to be verified by the first in-vehicle device. The first in-vehicle device obtains a result of verification performed by the third in-vehicle device on the first data, and determines, based on the result of verification performed by the third in-vehicle device on the first data, that the third in-vehicle device successfully verifies the first data. The first in-vehicle device determines, based on the fact that the first data is successfully verified by the third in-vehicle device and the first data fails to be verified by the first in-vehicle device, that the second data is abnormal, where the second data is the configuration information of the second in-vehicle device that is stored in the first in-vehicle device.

According to the foregoing method, when the first data corresponding to the first in-vehicle device fails to be verified, a possible cause is that the second data stored in the first in-vehicle device is abnormal, or the first data stored in the second in-vehicle device is abnormal. Therefore, the first in-vehicle device may determine, based on the fact that the third in-vehicle device successfully verifies the second data and the first data corresponding to the first in-vehicle device is successfully verified, that the second data is abnormal. In this way, abnormal data can be effectively determined, which helps the vehicle perform corresponding processing on the abnormal data, thereby improving data verification security and fault tolerance of the configuration information of the in-vehicle device.

In a possible implementation, the first in-vehicle device sends a third message to the third in-vehicle device, and the third message includes second verification information. The second verification information is used to verify the second data, and the second data is the configuration information of the second in-vehicle device that is stored in the first in-vehicle device. The first in-vehicle device receives a verification feedback message from the third in-vehicle device, and the verification feedback message includes the result of verification performed by the third in-vehicle device on the second data.

According to the foregoing method, when the first data corresponding to the first in-vehicle device fails to be verified, the first in-vehicle device may send the third message to the third in-vehicle device, to verify the second data, and further determine, based on the fact that the third in-vehicle device successfully verifies the second data, that the first data is abnormal. Correspondingly, if the second data fails to be verified by the third in-vehicle device, it may be determined that the second data is abnormal. There is no need to use another in-vehicle device to forward the verification result of the second data by the first in-vehicle device, thereby improving data verification efficiency, so that the first in-vehicle device can quickly respond to an abnormal result.

In a possible implementation, the first in-vehicle device receives a verification feedback message that is of third verification information and that is sent by the second in-vehicle device. The third verification information is used by the third in-vehicle device to perform verification on the first data, and the third verification information is sent by the second in-vehicle device to the third in-vehicle device. The verification feedback message of the third verification information is received by the second in-vehicle device from the third in-vehicle device, and the verification feedback message includes a result of verification performed by the third in-vehicle device on the first data. The first in-vehicle device determines the result of verification on the first data based on the verification feedback message.

According to the foregoing method, the first in-vehicle device may obtain the result of verification performed by the third in-vehicle device on the first data by using the result that is of the verification performed by the third in-vehicle device on the first data and that is obtained after the second in-vehicle device sends the third verification information to the third in-vehicle device, and further determines that the second data is abnormal based on the fact that the third in-vehicle device successfully verifies the first data. Correspondingly, if the first data fails to be verified by the third in-vehicle device, it may be determined that the first data is abnormal. Abnormal data can be effectively determined. In addition, if the first in-vehicle device further needs to perform verification on another in-vehicle device, the second in-vehicle device can effectively share a verification process, thereby improving verification efficiency.

In a possible implementation, the first in-vehicle device sends the second data to the second in-vehicle device, where the second data is used by the second in-vehicle device to update the first data.

According to the foregoing method, when determining that the second data is abnormal, the first in-vehicle device may send the second data to the second in-vehicle device, update the second data in the second in-vehicle device in a timely manner, and restore the second data in the second in-vehicle device to normal. In this way, fault tolerance of the configuration information of the in-vehicle device is improved.

In a possible implementation, the first in-vehicle device obtains the first data or the configuration information of the second device that is stored in the third in-vehicle device. The first in-vehicle device updates the second data based on the first data or the configuration information of the second device that is stored in the third in-vehicle device.

According to the foregoing method, when determining that the second data is abnormal, the first in-vehicle device may receive the first data sent by the first in-vehicle device, update the first data in the first in-vehicle device in a timely manner, and restore the first data in the first in-vehicle device to normal. In this way, fault tolerance of the configuration information of the in-vehicle device is improved.

In a possible implementation, the first in-vehicle device sends the result of verification on the first data to the second in-vehicle device.

According to the foregoing method, the first in-vehicle device may actively send the result of verification on the first data to the second in-vehicle device, and the second in-vehicle device does not need to actively perform a query, thereby improving data verification efficiency.

In a possible implementation, the first in-vehicle device sends a fifth message to the second in-vehicle device. The fifth message includes fourth verification information. The third verification information is used to verify third data of the first in-vehicle device. The third data is configuration information of the first in-vehicle device that is stored in the first in-vehicle device. The first in-vehicle device obtains a result of verification that is on the fourth verification information and that is returned by the second in-vehicle device.

According to the foregoing method, the configuration information of the first in-vehicle device that is stored in the first in-vehicle device may be verified by using configuration information of the first in-vehicle device that is stored in the second in-vehicle device, to improve security of the configuration information of the first in-vehicle device. For a specific verification manner, refer to a process in which the first in-vehicle device performs verification on the second data of the second in-vehicle device.

In a possible implementation, the first verification information is generated based on the first data and a first encryption key, and the first encryption key is an encryption key of the second in-vehicle device. The first in-vehicle device performs verification on the first data based on a first decryption key stored in the first in-vehicle device. The first decryption key and the first encryption key are a key pair.

According to the foregoing method, the first data may be encrypted by using the encryption key of the second in-vehicle device, and then the first in-vehicle device may perform verification on the first data by performing verification on the first verification information based on the first decryption key.

In a possible implementation, before the first in-vehicle device performs authentication on the identity of the second in-vehicle device based on the first authentication information, the method further includes: The first in-vehicle device sends a first random number to the second in-vehicle device, the first authentication information is generated by the second in-vehicle device by performing an operation on the first random number by using the first encryption key, and the first encryption key is the encryption key of the second in-vehicle device. The first in-vehicle device performs authentication on the first authentication information based on the first decryption key and the first random number. The first decryption key and the first encryption key are a key pair.

According to the foregoing method, the first random number sent by the first in-vehicle device may be used, so that the second in-vehicle device generates the first verification information based on the first random number and the first data. Further, the first in-vehicle device may perform verification on the first data by performing verification on the first verification information based on the first random number and the second data, thereby effectively improving security of data verification.

In a possible implementation, the first authentication information further includes a public key infrastructure PKI certificate of the second in-vehicle device, and the first in-vehicle device performs authentication on the PKI certificate of the second in-vehicle device.

According to the foregoing method, authentication may be performed on the identity information of the second in-vehicle device by using the PKI certificate of the second in-vehicle device. Verification is performed on the first data after the identity is determined to be valid through authentication, thereby effectively improving data verification security.

In a possible implementation, the first in-vehicle device determines, based on a result of authentication on first identity information, that the identity of the second in-vehicle device fails to be authenticated by the first in-vehicle device. The first in-vehicle device determines, based on the fact that the identity of the second in-vehicle device fails to be authenticated by the first in-vehicle device, that the identity of the second in-vehicle device is abnormal.

According to the foregoing method, before verification is performed on the first data of the second in-vehicle device, it may be determined, based on the fact that the authentication performed by the first in-vehicle device on the identity of the second in-vehicle device fails, that the identity of the second in-vehicle device is abnormal. This avoids further verification on the first data when the identity of the second in-vehicle device is abnormal, thereby improving verification efficiency of the first data.

According to a second aspect, an embodiment of this application provides a data verification apparatus, including units configured to perform the steps in the first aspect, and specifically, including a receiving unit, a sending unit, and a processing unit. The data verification apparatus may be the first in-vehicle device in the first aspect, a sub-apparatus in the first in-vehicle device, or may be an apparatus existing in the vehicle in a form independent of the first in-vehicle device. The data verification apparatus includes a corresponding module, unit, or means for implementing the foregoing method. The module, unit, or means may be implemented by hardware, software, or hardware executing corresponding software. The hardware or the software includes one or more modules or units corresponding to the foregoing functions.

According to a third aspect, an embodiment of this application further provides a data verification apparatus, including at least one processor and at least one memory, where the at least one memory is configured to store a program and data. The at least one processor is configured to invoke and execute the program and the data stored in the at least one memory, to perform the first aspect or the possible implementations of the first aspect of embodiments of this application, or perform the first aspect or the possible implementations of the first aspect of embodiments of this application. The processing unit may be implemented based on a processor, and the storage unit may be implemented based on a memory.

According to a fourth aspect, an embodiment of this application further provides a computer program product. When the computer program product runs on a processor, the data verification apparatus is enabled to perform various possible methods provided in the first aspect.

According to a fifth aspect, an embodiment of this application further provides a computer storage medium. The computer storage medium stores a computer program. When the computer program is executed by a processor, the data verification apparatus is enabled to perform various possible methods provided in the first aspect.

According to a sixth aspect, an embodiment of this application further provides a chip. The chip is configured to read a computer program stored in a memory, to perform various possible methods provided in the first aspect. The chip may be coupled to the memory.

According to a seventh aspect, an embodiment of this application further provides a chip system. The chip system includes a processor, configured to support a computer apparatus in implementing various possible methods provided in the first aspect. In a possible design, the chip system further includes a memory, and the memory is configured to store a program and data that are used by the computer apparatus. The chip system may include a chip, or may include a chip and another discrete component.

According to an eighth aspect, an embodiment of this application further provides a data verification system, including the data verification apparatus configured to implement a data verification function of the first in-vehicle device in the second aspect, the data verification apparatus corresponding to the data verification function of the second in-vehicle device in the second aspect, or the data verification apparatus corresponding to the data verification function of the third in-vehicle device in the second aspect.

For technical effects that can be achieved by the solutions in the second aspect to the eighth aspect, refer to descriptions of technical effects of corresponding solutions in the first aspect. Details are not described herein again.

DESCRIPTION OF EMBODIMENTS

Figure 1A:
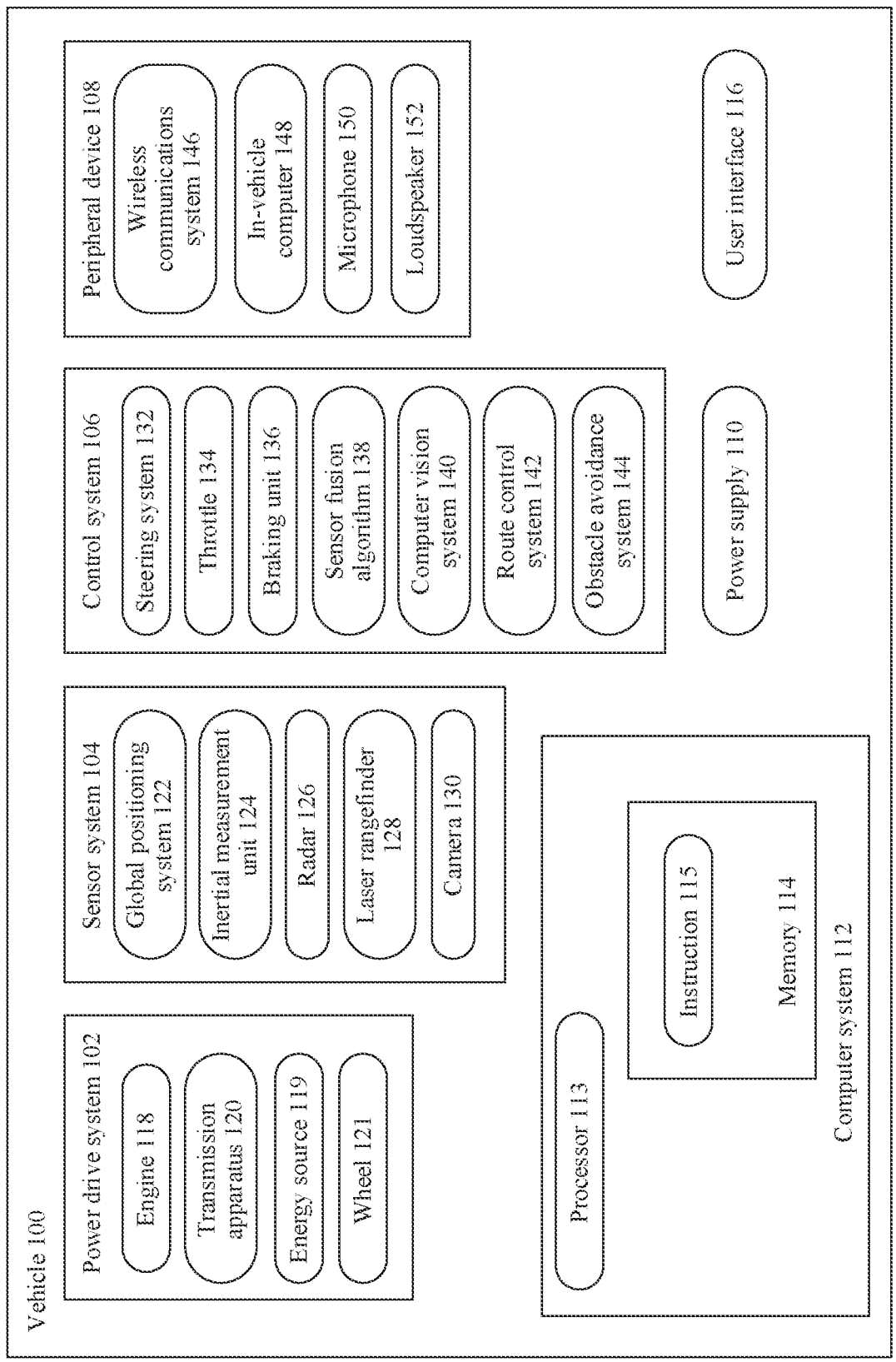
FIG. 1A is a schematic diagram of a structure of a vehicle according to an embodiment of this application.

The following describes embodiments of this application in detail with reference to the accompanying drawings.

The following first explains and describes some concepts that may be used in embodiments of this application, to make it easier to understand an implementation process of embodiments of this application.

(1) In-Vehicle Device

Any device placed or installed on a vehicle can be considered as an in-vehicle device. For a vehicle that can perform a self-driving function, a driving decision may be implemented after information collected by an in-vehicle device such as a sensor is processed by an ADAS system, a mobile data center (MDC), and the like.

In addition, an in-vehicle network of a vehicle may include a plurality of electronic control units (ECU), and all these ECUs may be considered as in-vehicle devices. The information collected by an in-vehicle device such as a sensor in a vehicle may be further processed by using an ECU, and then sent to a processor of the ADAS system or a processor of the MDC for processing. For example, an ECU is an on board unit (OBU), and is generally installed on a vehicle. In an electronic toll collection (ETC) system, the OBU may communicate with a road side unit (RSU). For example, the OBU and the RSU may communicate with each other by using a microwave. In other words, when a vehicle passes through the RSU, the OBU and the RSU may communicate with each other by using the microwave. In the ETC system, the OBU uses a dedicated short range communications (DSRC) technology to establish a microwave communication link with the RSU. On the way of a vehicle, the OBU can implement processes such as vehicle identification or electronic fee deduction without stopping the vehicle.

For another example, the in-vehicle device may alternatively be a gateway controller. As a data exchange hub of an entire vehicle network, the gateway controller may route network data such as an in-vehicle controller area network (CAN), a local interconnect network (LIN), and a media-oriented system transport (MOST), and an in-vehicle network FlexRay on different networks. The gateway controller can be independently disposed, to improve vehicle topology scalability, vehicle security, and vehicle network data confidentiality.

For example, the gateway controller may be a telematics BOX (T-BOX), is mainly used for communication between a vehicle and an Internet of Vehicles service platform, and may include modules such as an on-board diagnostics (OBD), a microcontroller unit (MCU)/central processing unit (CPU), a memory, and a communications interface. Components or modules inside the vehicle are connected to a CAN bus to transmit instructions and information. Outside the vehicle, a cloud platform is connected to terminal devices to exchange information inside and outside the vehicle.

The T-Box is an in-vehicle wireless gateway, and is mainly configured to communicate with an in-vehicle device/terminal device, implement vehicle information display and control, and provide services such as driving data collection, driving track recording, vehicle fault monitoring, driving behavior analysis, wireless hotspot sharing, and remote vehicle query and control. The T-Box implements functions such as remote wireless communication, GNSS satellite positioning, acceleration sensing, and bus communication over a network, and provides a communication interface for the vehicle. The communication interface is connected to a bus, including CAN, LIN, a commissioning interface RS232/RS485/USB2.0, and in-vehicle Ethernet. Take the CAN bus as an example. The T-Box connects to the CAN bus through an interface and collects data through the CAN network. Data such as vehicle information, vehicle controller information, motor controller information, a battery management system (BMS), and a vehicle-mounted charger are collected and parsed. After the information is collected, the T-Box stores collected real-time data in an internal storage medium. After information collected by the in-vehicle terminal is processed, the information may be displayed on a display screen of the in-vehicle terminal by using the gateway, so that a user performs overall control on the display screen, for example, controlling door opening and closing, blinking a light, turning on an air conditioner, starting an engine, and positioning a vehicle. In addition, the user may further implement the remote vehicle query and control by using the terminal device. For example, the user may remotely query a fuel amount of a vehicle fuel tank, a status of a vehicle window and door, a battery level, an available driving mileage, and an available driving time. Remote vehicle control includes remote control of vehicle locking and unlocking, air conditioner control, vehicle window control, transmitter torque limit, and engine startup and shutdown.

Alternatively, if various terminal devices described below are located on the vehicle (for example, placed in the vehicle or installed in the vehicle), the terminal devices may be considered as in-vehicle terminal devices, or referred to as in-vehicle devices. A terminal device includes a device that provides a user with voice and/or data connectivity, for example, may include a handheld device with a wireless connection function, or a processing device connected to a wireless modem. The terminal device may communicate with a core network by using a radio access network (RAN), and exchange voice and/or data with the RAN. The terminal device may include user equipment (UE), a wireless terminal device, a mobile terminal device, a device-to-device (D2D) terminal device, a V2X terminal device, a machine-to-machine/machine type communications (M2M/MTC) terminal device, an Internet of Things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer having a mobile terminal device, and a portable, pocket-sized, handheld, or computer built-in mobile in-vehicle device. For example, a personal communication service (PCS) phone, a cordless phone, a session initiation protocol (SIP) phone, a wireless local loop (WLL) station, a personal digital assistant (PDA), and the like. The terminal device further includes a limited device, for example, a device with relatively low power consumption, a device with a limited storage capability, or a device with a limited computing capability. For example, an information sensing device such as a barcode, radio frequency identification (RFID), a sensor, a global positioning system (GPS), and a laser scanner are included.

As an example instead of a limitation, in embodiments of this application, the in-vehicle device placed or installed on the vehicle may further include a wearable device. The wearable device is not only a hardware device, but also can implement powerful functions through software support, data interaction, and cloud interaction. In a broad sense, a wearable device may include a device that has full functions and a large size, and implements a complete function without depending on a smartphone. For example, this type of device may include a smart watch, smart glasses, or the like. Alternatively, the wearable device may be a device that needs to rely on a smartphone to implement a complete function, for example, various smart bands, smart helmets, and smart jewelry that perform sign monitoring.

(2) Automotive Open System Architecture (AUTOSAR)

AUTOSAR is an open and standardized software architecture jointly established by global vehicle manufacturers, component suppliers, and electronic software system companies. AUTOSAR has the following features: a. AUTOSAR is dedicated to solving software development difficulties caused by different hardware platforms, so that developers can focus on innovation in vehicle software functions. b. AUTOSAR provides standard software interface definitions. Engineers can allocate software components to ECUs of vehicles based on actual requirements to implement reusability of standard software components. c. The application layer software components of AUTOSAR are independent of hardware. Application developers can specify details of each vehicle function in application software without worrying about incompatibility between underlying software services and hardware interfaces.

(3) Public Key Infrastructure (PKI) Certificate

A PKI certificate is obtained by a trusted third party through signing by using a private key of the trusted third party. The trusted third party may be, for example, a certificate authority (CA) or another trusted device (or system). That is, the trusted third party is an authority that issues the PKI certificate and performs online identity authentication (ID card) for each authorized user in the system. The PKI certificate can be used to check whether communication parties are trusted. During PKI certificate-based authentication, a signer of the PKI certificate uses a private key of the signer (such as the CA) to generate a signature, and a verifier uses a public key of the signer to perform verification on the signature. The following two steps may be included: Step 1: The verifier performs verification on the signature of the CA on the PK certificate to verify that the PK certificate is a valid certificate signed by the CA, thereby determining that the PK certificate is authentic and valid. Step 2: The verifier may require the signer to sign a challenge value, and the verifier may use the public key of the signer to verify the signature of the signer on the challenge value. If the verification succeeds, it may be proved to the verifier that the signer has a corresponding private key.

The terms "system" and "network" may be used interchangeably in embodiments of this application. "At least one" means one or more, and "a plurality of" means two or more. A term "and/or" describes an association relationship between associated objects and indicates that there may be three relationships. For example, A and/or B may represent the following three cases: Only A exists, both A and B exist, and only B exists, where A and B may be singular or plural. The character "/" generally indicates an "or" relationship between the associated objects. "At least one of the following" or a similar expression thereof refers to any combination of these items, including any combination of a single item or a plural item. For example, at least one of a, b, or c may represent a, b, c, a and b, a and c, b and c, or a, b, and c, where a, b, and c may be singular or plural.

Unless otherwise specified, ordinal numbers such as "first" and "second" mentioned in embodiments of this application are used to distinguish between a plurality of objects, but are not used to limit a sequence, a time sequence, priorities, or importance of the plurality of objects. For example, a first message and a second message are merely used to distinguish between different messages, but do not indicate that priorities, sending sequences, importance degrees, or the like of the two types of messages are different.

The foregoing describes some concepts in embodiments of this application, and the following describes technical features in embodiments of this application.

FIG. 1A is a functional block diagram of a vehicle 100 according to an embodiment of this application. The vehicle 100 may include various subsystems, and the subsystems include different in-vehicle devices, for example, a power drive system 102, a sensing system 104, a control system 106, one or more peripheral devices 108, a power supply 110, a computer system 112, and a user interface 116. Optionally, the vehicle 100 may include more or fewer subsystems, and each subsystem may include a plurality of in-vehicle devices. In addition, each subsystem and in-vehicle device of the vehicle 100 may be interconnected in a wired or wireless manner.

The power drive system 102 may include a component that provides power motion for the vehicle 100. In an embodiment, the power drive system 102 may include an engine 118, an energy source 119, a transmission apparatus 120, and a wheel/tire 121. The engine 118 may be an internal combustion engine, an electric motor, an air compression engine, or another type of engine combination, for example, a hybrid engine including a gas-oil engine and an electric motor, or a hybrid engine including an internal combustion engine and an air compression engine. The engine 118 converts the energy source 119 into mechanical energy.

Examples of energy sources 119 include gasoline, diesel, other oil-based fuels, propane, other compressed gas-based fuels, anhydrous alcohol, solar panels, batteries, and other sources of electricity. The energy source 119 may also provide energy for another system of the vehicle 100.

The transmission apparatus 120 may transfer mechanical power from the engine 118 to the wheel 121. The transmission apparatus 120 may include a gearbox, a differential, and a drive shaft. In an embodiment, the transmission apparatus 120 may further include another device, for example, a clutch. The drive shaft may include one or more shafts that may be coupled to one or more wheels 121.

The sensing system 104 may include several sensors configured to sense information about an environment around the vehicle 100. For example, the sensing system 104 may include a global positioning system 122 (which may be a GPS system, a BeiDou system, or another positioning system), an inertial measurement unit (IMU) 124, a radar 126, a laser rangefinder 128, and a camera 130. The sensing system 104 may further include a sensor (for example, an in-vehicle air quality monitor, a fuel gauge, and an oil thermometer) of an internal system of the monitored vehicle 100. Sensor data from one or more of these sensors may be used to detect objects and their corresponding characteristics (position, shape, direction, speed, etc.). Such detection and recognition are key functions of safe operation of the autonomous vehicle 100.

The global positioning system 122 may be used to estimate a geographical location of the vehicle 100. The IMU 124 is configured to sense a position and an orientation change of the vehicle 100 based on an inertial acceleration. In an embodiment, the IMU 124 may be a combination of an accelerometer and a gyroscope.

The radar 126 may sense an object in an ambient environment of the vehicle 100 by using a radio signal. In some embodiments, in addition to sensing the object, the radar 126 may be further configured to sense a speed and/or a moving direction of the object.

The laser rangefinder 128 may sense an object in an environment in which the vehicle 100 is located by using a laser. In some embodiments, the laser rangefinder 128 may include one or more laser sources, laser scanners, one or more detectors, and other system components.

The camera 130 may be configured to capture a plurality of images of the ambient environment of the vehicle 100. The camera 130 may be a static camera or a video camera.

The control system 106 is configured to control operations of the vehicle 100 and components of the vehicle 100. The control system 106 may include various in-vehicle devices, including a steering system 132, a throttle 134, a braking unit 136, a sensor fusion algorithm 138, a computer vision system 140, a route control system 142, and an obstacle avoidance system 144.

The steering system 132 may operate to adjust a forward direction of the vehicle 100. For example, in an embodiment, a steering wheel system may be used.

The throttle 134 is configured to control an operating speed of the engine 118 and further control a speed of the vehicle 100.

The braking unit 136 is configured to control the vehicle 100 to decelerate. The braking unit 136 may use friction to slow down the wheel 121. In another embodiment, the braking unit 136 may convert kinetic energy of the wheel 121 into a current. The braking unit 136 may also slow down a rotational speed of the wheel 121 in another form, to control the speed of the vehicle 100.

The computer vision system 140 may operate to process and analyze an image captured by the camera 130 in order to recognize an object and/or feature in the ambient environment of the vehicle 100. The object and/or feature may include a traffic signal, a road boundary, and an obstacle. The computer vision system 140 may use an object recognition algorithm, a structure from motion (SFM) algorithm, video tracking, and another computer vision technology. In some embodiments, the computer vision system 140 may be configured to draw a map for an environment, track an object, estimate a speed of the object, and the like.

The route control system 142 is configured to determine a driving route of the vehicle 100. In some embodiments, the route control system 142 may determine the driving route for the vehicle 100 in combination with data from the sensor fusion algorithm 138, the GPS 122, and one or more predetermined maps.

The obstacle avoidance system 144 is configured to identify, evaluate, and avoid or otherwise cross a potential obstacle in the environment of the vehicle 100.

Certainly, in an example, the control system 106 may add or replace components of the in-vehicle device or the in-vehicle device other than those shown and described, or may reduce some of the components shown above.

The vehicle 100 interacts with an external sensor, another vehicle, another computer system, or a user by using the peripheral devices 108. The peripheral devices 108 may include a wireless communications system 146, an in-vehicle computer 148, a microphone 150, and/or a speaker 152.

In some embodiments, the peripheral devices 108 provide means for a user of the vehicle 100 to interact with the user interface 116. For example, the in-vehicle computer 148 may provide information to the user of the vehicle 100. The user interface 116 may further operate the in-vehicle computer 148 to receive an input of the user. The in-vehicle computer 148 may be operated by using a touchscreen. In other cases, the peripheral devices 108 may provide means for the vehicle 100 to communicate with another device located in the vehicle. For example, the microphone 150 may receive audio (for example, a voice command or other audio input) from the user of the vehicle 100. Similarly, the speaker 152 may output audio to the user of the vehicle 100.

The wireless communications system 146 may communicate wirelessly with one or more devices directly or via a communications network. For example, the wireless communications system 146 may use 3G cellular communication, such as CDMA, EVD0, GSM/GPRS, or 4G cellular communication, such as LTE, or 5G cellular communication. The wireless communications system 146 may communicate with a wireless local area network (WLAN) by using Wi-Fi. In some embodiments, the wireless communications system 146 may directly communicate with a device by using an infrared link, Bluetooth, or ZigBee. Other wireless protocols, such as various vehicle communications systems, for example, wireless communications system 146 may include one or more dedicated short range communications (DSRC) devices, and these devices may include public and/or private data communications between vehicles and/or roadside stations.

The power supply 110 may supply power to various components of the vehicle 100. In an embodiment, the power supply 110 may be a rechargeable lithium ion or lead-acid battery. One or more battery packs of such battery may be configured as a power supply to supply power to various components of the vehicle 100. In some embodiments, the power supply 110 and the energy source 119 may be implemented together. For example, in some all-electric vehicles, the power supply 110 and the energy source 119 may be implemented together.

Some or all functions of the vehicle 100 are controlled by the computer system 112. The computer system 112 may include at least one processor 113, and the processor 113 executes instructions 115 stored in a non-transient computer-readable medium such as the memory 114. The computer system 112 may alternatively be a plurality of computing devices that control individual components or subsystems of the vehicle 100 in a distributed manner.

The processor 113 may be any conventional processor, for example, a commercially available CPU. Optionally, the processor may be a dedicated device such as an ASIC or another hardware-based processor. Although FIG. 1A functionally shows the processor and the memory in the computer system 112, a person of ordinary skill in the art should understand that the processor or the memory may actually include a plurality of processors or memories that are not stored in a same physical housing. For example, the memory may be a hard disk drive or another storage medium located in a storage medium different from that in the computer system 112. Therefore, a reference to the processor is understood as including a reference to a set of processors or memories that may or may not operate in parallel. Unlike using a single processor to perform the steps described herein, some components such as a steering component and a deceleration component may each have their own processor, and the processor performs only computations related to component-specific functions.

In various aspects described herein, the processor may be located far away from the vehicle and wirelessly communicate with the vehicle. In other aspects, some of the steps of the processes described herein may be performed on a processor arranged in the vehicle, while other processes may be performed by a remote processor.

In some embodiments, the memory 114 may include the instructions 115 (for example, program logic), and the instructions 115 may be invoked by the processor 113 to perform various functions of the vehicle 100, including those functions described above. The memory 114 may also include additional instructions, including instructions for sending data to, receiving data from, interacting with, and/or controlling one or more of the power drive system 102, the sensing system 104, the control system 106, and the peripheral devices 108.

In addition to the instructions 115, the memory 114 may further store data, such as a road map, route information, a location, a direction, a speed, and other such vehicle data of a vehicle, and other information. Such information may be used by the vehicle 100 and the computer system 112 during operation of the vehicle 100 in autonomous, semi-autonomous, and/or manual modes.

The user interface 116 is configured to provide information to or receive information from the user of the vehicle 100. Optionally, the user interface 116 may include one or more input/output devices in a set of the peripheral devices 108, such as the wireless communications system 146, the in-vehicle computer 148, the microphone 150, and the speaker 152.

The computer system 112 may control functions of the vehicle 100 based on inputs received from various subsystems (e.g., the power drive system 102, the sensing system 104, and the control system 106) and from the user interface 116. In some embodiments, the computer system 112 may operate to provide control over many aspects of the vehicle 100 and its subsystems.

Optionally, one or more of these components may be separately mounted or associated with the vehicle 100. For example, the memory 114 may be partially or completely separated from the vehicle 100. The foregoing components may be communicatively coupled together in a wired and/or wireless manner.

Optionally, the foregoing components are merely examples. In actual application, components in the foregoing modules may be added or deleted based on an actual requirement. FIG. 1A should not be understood as a limitation on this embodiment of this application.

Figure 1B:
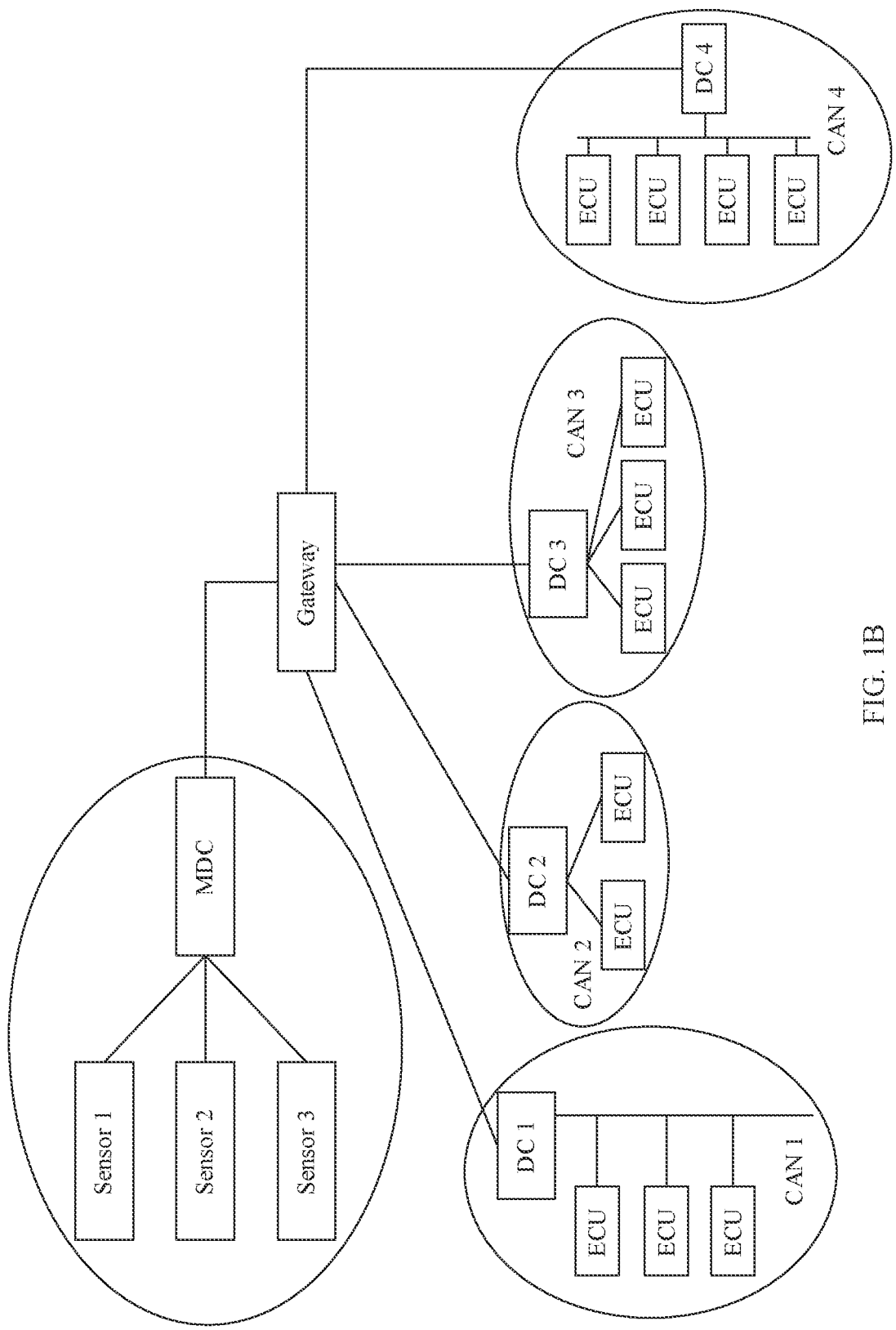
FIG. 1B and FIG. 1C are schematic diagrams of a system architecture of a vehicle to which an embodiment of this application is applied.

The following describes a network architecture to which embodiments of this application are applied. FIG. 1B shows a network architecture to which an embodiment of this application is applied.

As shown in FIG. 1B, the vehicle may use an electrical/electronic (E/E) structure, or may use a central computing architecture (CCA). As shown in FIG. 1B, an example in which an architecture of the vehicle includes three layers: a gateway, a domain controller, and an intra-domain ECU is used for description. With reference to FIG. 1A, to improve management and control of an in-vehicle device in each subsystem in the vehicle, the in-vehicle devices may be divided into several domains based on the subsystem. Each domain has one domain controller, and each domain includes one or more in-vehicle devices. Each domain has one domain controller (DC). For example, the sensing system 104 (which may include, for example, an ADAS sensor) forms a domain whose domain controller is an MDC. The power drive system 102 may be considered as one domain (for example, an intelligent driving system domain), the control system 106 may be considered as one domain (an entire vehicle control system domain), and the peripheral device may be considered as one domain (for example, an entertainment system domain). Certainly, the domain may be further divided based on another factor. This is not limited herein.

As shown in FIG. 1B, four domain controllers: DC 1, DC 2, DC 3, and DC 4 are included. The four domain controllers correspond to four domains. An example in which all in-vehicle devices in the four domains are ECUs is used. The domain controller is configured to manage the ECUs in the domain. For the domain controller, for example, an in-vehicle device in the domain is randomly selected as the domain controller, or an in-vehicle device that has an overall management function in the domain may be selected as the domain controller. The devices in the domain communicate with the gateway through the DC. The gateway is the core of the vehicle architecture. As the hub for data exchange on the vehicle network, the gateway can route network data such as the CAN and the LIN on different networks. In a possible manner, the intra-domain ECUs may be connected based on a controller area network (CAN) bus, that is, the intra-domain ECUs may communicate with each other by using a CAN protocol. As shown in FIG. 1B, a CAN bus 1, a CAN bus 2, a CAN bus 3, and a CAN bus 4 are used as examples. The CAN bus 1 may correspond to the vehicle control system domain, the CAN bus 2 may correspond to the entertainment system domain, the CAN bus 3 may correspond to the intelligent driving system domain, and the CAN bus 4 may correspond to the peripheral device domain or an intelligent cockpit domain.

Figure 1C:
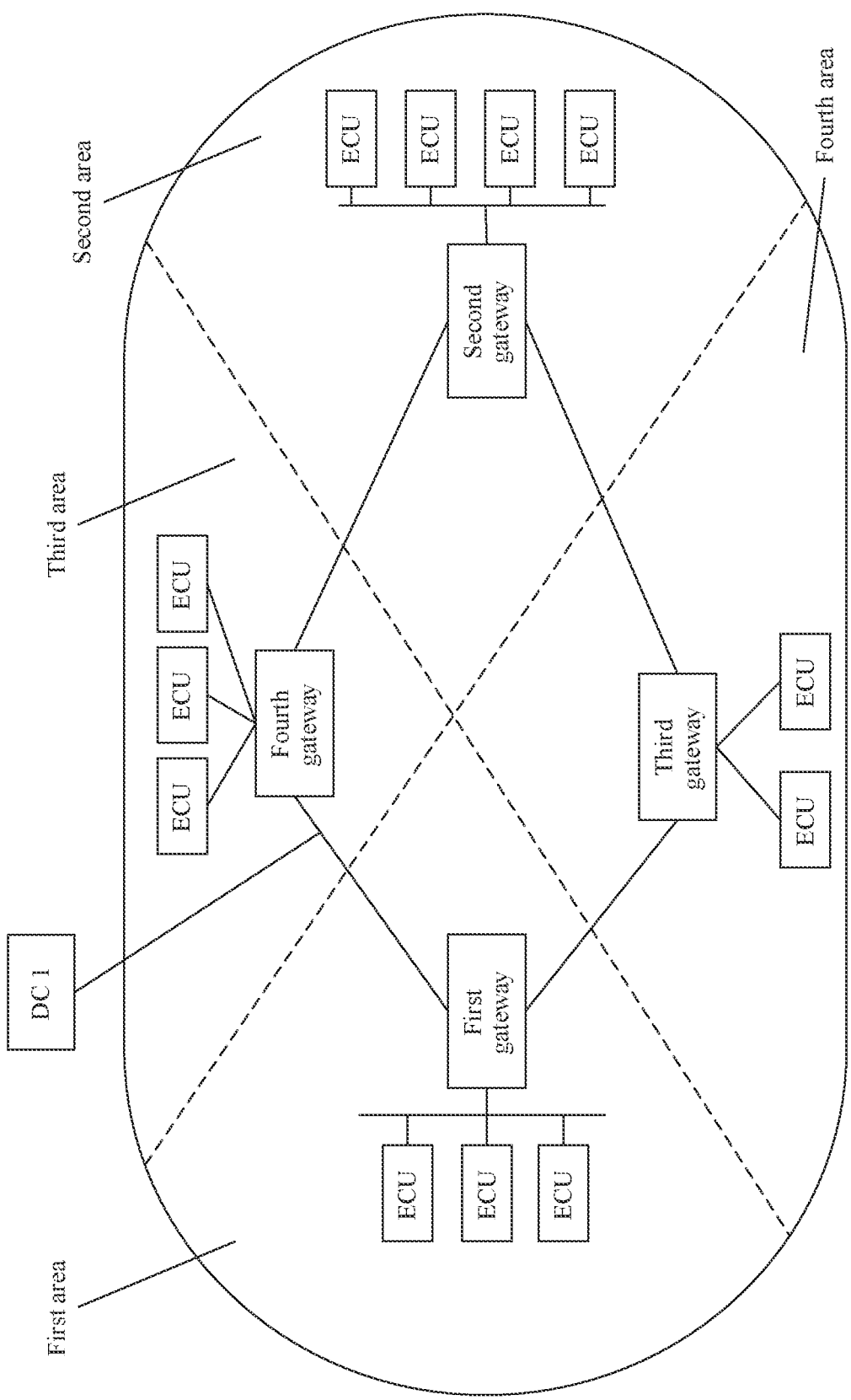

Further, considering impact of a harness on communication, a central gateway may be set as a distributed gateway. For example, the distributed gateway may be an integrated vehicle unit (vehicle integrated/integration unit, VIU). The distributed gateways can be connected in serial mode to form a ring network. Communication between the gateways may be forwarded by using an adjacent gateway. For example, as shown in FIG. 1C, when sending data to a second gateway, a first gateway may send the data to the second gateway by using a third gateway or a fourth gateway. An in-vehicle device may be connected, based on a location at which the in-vehicle device is disposed in the vehicle, to a gateway that is relatively close to the in-vehicle device, and may be connected to the domain controller by using the gateway. As shown in FIG. 1C, the vehicle may be divided into four areas, and a first area includes N1 in-vehicle devices in DC 1. The N1 in-vehicle devices in the first area may be connected to DC 1 by using the first gateway. A second area includes N2 in-vehicle devices in DC 1, and the N2 in-vehicle devices in the second area may be connected to DC 1 by using the second gateway. A third area includes N3 in-vehicle devices in DC 1, and the N3 in-vehicle devices in the third area may be connected to DC 1 by using the third gateway. A fourth area includes N4 in-vehicle devices in DC 1, and the N4 in-vehicle devices in the fourth area may be connected to DC 1 by using the fourth gateway. Similarly, with reference to FIG. 1B, in-vehicle devices in different domains may be connected to different VIUs based on a connection manner between DC 1 and the in-vehicle device in DC 1 and a location of the in-vehicle device in the vehicle. This avoids that each in-vehicle device in a conventional system for implementing an electronic control function in a vehicle needs to be connected to a domain controller by using a respective harness, helps reduce a length of the harness in the system for implementing the electronic control function in the vehicle, to reduce complexity of communication between in-vehicle devices, facilitate production and installation of the in-vehicle devices, simplifies in-vehicle network configuration, and improves upgrade and maintenance efficiency.

Certainly, in the architecture of the vehicle, domains may not be distinguished, and the architecture of the vehicle may alternatively include two levels, for example, include a vehicle integration unit (VIU) and an ECU. The VIU is connected based on a location of the in-vehicle device in the vehicle, and data is transmitted between the ECUs through the VIU.

It should be noted that FIG. 1B and FIG. 1C are merely schematic diagrams, and are not intended to limit this application. For another example, both a quantity of domains included in the vehicle architecture and a quantity of ECUs in the domains may be greater than those shown in FIG. 1B and FIG. 1C, or may be less than those shown in FIG. 1B and FIG. 1C. In addition, the system architecture described in this application is intended to describe the technical solutions in this application more clearly, but does not constitute a limitation on the technical solutions provided in this application. A person of ordinary skill in the art may learn that, as the system architecture evolves, the technical solutions provided in this application are also applicable to similar technical problems.

For in-vehicle devices of a same type, types of configuration parameters of the in-vehicle devices may be the same. However, depending on different vehicles, in-vehicle devices located in different vehicles may be configured with different configuration parameter values based on specific vehicles. For example, when an IP address is allocated to each gateway, the IP address may be determined based on a location of the gateway in the vehicle. As shown in FIG. 1C, the first gateway is located at a vehicle head location of the vehicle, and an IP address of the first gateway may be set to IP 1. The second gateway is located at a rear of the vehicle, and an IP address of the second gateway may be set to IP 2. The third gateway is located on a left side of the vehicle, and an IP address of the third gateway may be set to IP 3. The fourth gateway is located on a right side of the vehicle, and an IP address of the fourth gateway may be set to IP 4. The VIU forwards the data based on the configuration result. Once configured, the parameter values do not change. Otherwise, the normal communication between in-vehicle devices is affected. Therefore, protection of configuration information such as the configuration parameters is particularly important.

To prevent the configuration information such as the configuration parameters in the VIU from being tampered with, access permission control can be used to prevent unauthorized users from tampering with the configuration information. The access permission may be controlled in a manner of user name and password authentication, so that an authorized user logs in. However, this method may cause an unauthorized user to change root permission by using a vulnerability, and cause a common user to have the root permission and modify the configuration information such as the configuration parameter of the in-vehicle device. As a result, the configuration information of the in-vehicle device is modified when the in-vehicle device is not replaced. Consequently, during communication between the in-vehicle devices, the VIU may not know a change of the configuration information, and data between the in-vehicle devices cannot be normally sent. In addition, in a process of upgrading, updating, or the like of the in-vehicle device, in the current technology, the in-vehicle device mainly depends on manual configuration of the in-vehicle device by installation personnel. As a result, the configuration in the in-vehicle device may not correspond to the updated in-vehicle device, and the updated in-vehicle device cannot be normally used. Therefore, when an in-vehicle device is replaced, in addition to configuring configuration information of the in-vehicle device, a configuration parameter of another in-vehicle device related to the replaced in-vehicle device needs to be correspondingly modified, to ensure normal running between the in-vehicle devices, thereby increasing installation difficulty of the in-vehicle device.

Figure 2:
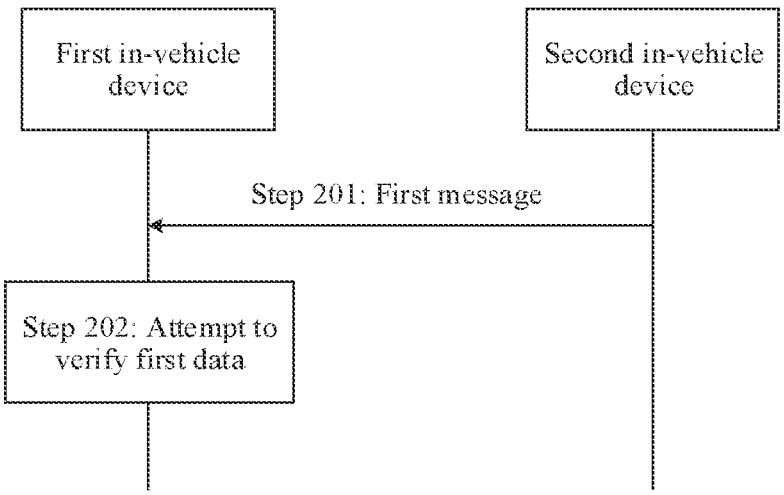
FIG. 2 is a flowchart of a data verification method according to an embodiment of this application.

Based on the foregoing problem, an embodiment of this application provides a first data verification method. FIG. 2 is a flowchart of the method. In the following description process, an example in which the method is implemented in the network architecture shown in FIG. 1B and FIG. 1C is used. In addition, the method may be executed by at least two in-vehicle devices, and the two in-vehicle devices are, for example, a first in-vehicle device and a second in-vehicle device. The first in-vehicle device or the second in-vehicle device may be an in-vehicle device or an apparatus (for example, a chip system) that can support the in-vehicle device in implementing a function described in the method, or certainly may be another apparatus. In addition, implementations of the first in-vehicle device and the second in-vehicle device are not limited. For example, the two in-vehicle devices may be implemented in a same form, for example, implemented in a form of a device, or the two in-vehicle devices may be implemented in different forms, for example, the first in-vehicle device is implemented in a form of a device, and the second in-vehicle device is implemented in a form of a chip system, or the like.

For ease of description, the following uses an example in which the method is performed by the first in-vehicle device and the second in-vehicle device. In this embodiment, an example in which the network architecture shown in FIG. 1B and FIG. 1C is used. The first in-vehicle device may be the first gateway in the network architecture shown in FIG. 1C. The second in-vehicle device may be the second gateway in the network architecture shown in FIG. 1C. Certainly, the first in-vehicle device and the second in-vehicle device may alternatively be domain controllers (for example, DC 1 to DC 4 or MDC in FIG. 1B, or DC 1 in FIG. 1C) in the network architectures shown in FIG. 1B and FIG. 1C, or may be in-vehicle devices in a domain in the network architecture shown in FIG. 1B and FIG. 1C.

S201. The second in-vehicle device sends a first message to the first in-vehicle device.

Correspondingly, the first in-vehicle device receives the first message from the second in-vehicle device. The first message includes first verification information, the first verification information is used to perform verification on first data, and the first data is configuration information of the second in-vehicle device that is stored in the second in-vehicle device.

The first in-vehicle device and the second in-vehicle device are carried in a first vehicle. The first vehicle may carry one or more in-vehicle devices in the first area. The first in-vehicle device may be an in-vehicle device in the first area. In a possible implementation, the second in-vehicle device may be an in-vehicle device in the first area, or may be an in-vehicle device in another area. This is not limited herein. The first in-vehicle device may be configured to communicate with one or more in-vehicle devices in the first area, and may communicate with one or more in-vehicle devices in another area. To ensure normal running of the first in-vehicle device, the first in-vehicle device needs to store at least configuration information of the first in-vehicle device. For example, the configuration information of the first in-vehicle device may include configuration information used for normal working of the first in-vehicle device. The ECU 1 is used as an example. Configuration information used for normal working of the ECU 1 may include: an area in which the ECU 1 is located, an identifier of the ECU 1, a quantity of interfaces of the ECU 1, an IP address of the ECU 1, and the like. Further, to ensure normal communication between the first in-vehicle device and another in-vehicle device, the configuration information of the first in-vehicle device may further include configuration information used for communication between the first in-vehicle device that communicates with the first in-vehicle device and the another in-vehicle device. The another in-vehicle device may be an in-vehicle device in the first area, or may be an in-vehicle device in another area. This is not limited herein.

For example, the first in-vehicle device is the first gateway, and one or more in-vehicle devices in the first area communicate with another in-vehicle device by using the first gateway. In this case, the configuration information of the first in-vehicle device may include: configuration information that is of the one or more in-vehicle devices and that is used for communication with the one or more in-vehicle devices in the first area, or configuration information for communication between the one or more in-vehicle devices in the first area and another in-vehicle device.

For example, if the first gateway is configured to communicate with the ECU 1 in the first area, the first gateway needs to store configuration information of the ECU 1, for example, the identifier of the ECU 1, an identifier of another in-vehicle device communicating with the ECU 1, the IP address and port information of the ECU 1, and intrusion detection (intrusion detection systems. IDS) configuration information. The first gateway may monitor a running status of a network and a system according to a specific security policy by using the IDS configuration information (for example, related information whose encryption mechanism is a message digest function MD5), to ensure confidentiality, integrity, and availability of network system data. For example, the first gateway may use configuration information of the second in-vehicle device as to-be-verified data, and perform integrity analysis on the to-be-verified data based on the IDS configuration information, to determine whether the to-be-verified data is modified. For another example, if the ECU 1 in the first area communicates with the ECU 1 in the second area by using a first interface, the configuration information of the ECU 1 that the first gateway needs to store further includes the first interface for communicating with the ECU 1 in the second area.

For another example, if the first in-vehicle device is the ECU 1, the ECU 1 communicates with DC 1 by using the first gateway, the configuration information of the ECU 1 may include the configuration information of the ECU 1, for example, the IP address of the ECU 1 and the identifier of the ECU 1. The configuration information of the ECU 1 may further include configuration information of the first gateway, for example, an IP address and a port number of the first gateway. The configuration information of the ECU 1 may further include configuration information of DC 1, for example, an IP address of DC 1.

The first vehicle may further carry one or more in-vehicle devices in the second area. For example, the second in-vehicle device may be an in-vehicle device in the second area. The second in-vehicle device may be configured to communicate with one or more in-vehicle devices in the second area, and the second in-vehicle device may be configured to communicate with an in-vehicle device in another area. The second in-vehicle device needs to store at least the configuration information of the second in-vehicle device. The configuration information of the second in-vehicle device may include configuration information used for communication between the second in-vehicle device and another in-vehicle device, and configuration information used for normal working of the second in-vehicle device.

For communication between gateways, for example, if the first gateway needs to communicate with the second gateway, the configuration information of the first gateway may include an IP address of the second gateway and an identifier of the second gateway. With reference to FIG. 1C, the first gateway needs to communicate with the second gateway by using the third gateway or the fourth gateway. Therefore, the configuration information of the first gateway may further include an IP address of the third gateway or an IP address of the fourth gateway. In this case, the IP address of the third gateway or the IP address of the fourth gateway may be used as a next-hop routing address used when the first gateway and the second gateway send data packets.

Further, if the second in-vehicle device is the second gateway, and one or more in-vehicle devices in the second area communicate with another in-vehicle device by using the second gateway, the configuration information of the second in-vehicle device may include configuration information used for communication with one or more in-vehicle devices in the second area, or configuration information for communication between one or more in-vehicle devices in the second area and another in-vehicle device.

For example, with reference to FIG. 1C, if the second gateway needs to communicate with the third gateway or the fourth gateway, the configuration information of the second gateway may further include the IP address of the third gateway and an identifier of the third gateway, or the IP address of the fourth gateway and an identifier of the fourth gateway. In this case, the IP address of the third gateway or the IP address of the fourth gateway may be used as a destination address used when the first gateway and the second gateway send data packets. If the second gateway needs to communicate with the first gateway, the configuration information of the second gateway may further include: the IP address of the third gateway and the identifier of the third gateway; or the IP address of the fourth gateway and the identifier of the fourth gateway: and the IP address of the first gateway and the identifier of the third gateway. In this case, the IP address of the third gateway or the IP address of the fourth gateway may be used as a next-hop routing address used when the second gateway and the first gateway send data packets.

S202. The first in-vehicle device performs verification on the first data based on configuration information of the second in-vehicle device that is stored in the first in-vehicle device and the first verification information.

In this embodiment of this application, the first in-vehicle device may be used as a verification node of the second in-vehicle device. To ensure a verification effect, the first in-vehicle device may store the configuration information of the second in-vehicle device, and then the first in-vehicle device may verify the configuration information of the second in-vehicle device that is stored in the second in-vehicle device based on the configuration information of the second in-vehicle device that is stored in the first in-vehicle device.

Based on a same inventive concept, the second in-vehicle device may also be used as a verification node of the first in-vehicle device. In this case, the second in-vehicle device stores the configuration information of the first in-vehicle device, for example, third data. In this case, the first in-vehicle device may send a fifth message to the second in-vehicle device, where the fifth message includes fourth verification information. The third verification information is used to verify the third data of the first in-vehicle device. The third data is configuration information of the first in-vehicle device that is stored in the first in-vehicle device.

Further, the second in-vehicle device may verify, based on configuration information of the first in-vehicle device that is stored in the second in-vehicle device, the configuration information of the first in-vehicle device that is stored in the first in-vehicle device. The first in-vehicle device obtains a verification result that is of the fourth verification information and that is returned by the second in-vehicle device. Therefore, the first in-vehicle device determines whether the third data is normal. For a specific implementation process, refer to a process shown in FIG. 2 to FIG. 10 in which the first in-vehicle device performs verification on the first data in embodiments of this application. Details are not described herein again.

Figure 3:
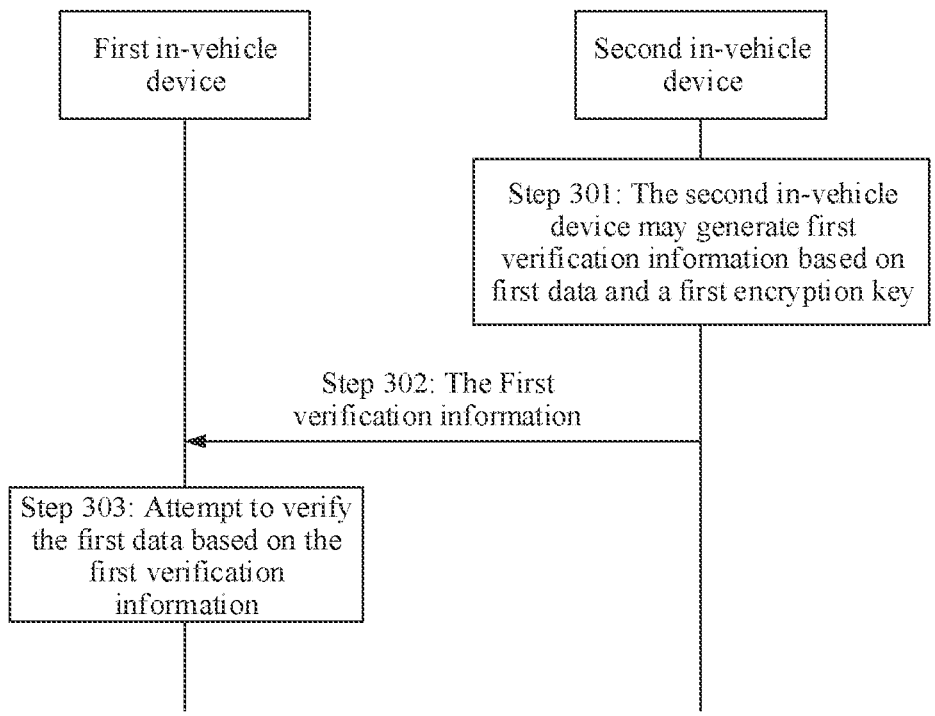
FIG. 3 is a flowchart of a data verification method according to an embodiment of this application.

To better understand the technical solution described in the embodiment shown in FIG. 2, the following describes some sub-solutions in the embodiment shown in FIG. 2 by using examples. FIG. 3 is a flowchart of an implementation of a data verification method according to an embodiment of this application. The following uses an example to describe a possible verification manner of the first data in this application. In the procedure shown in FIG. 3, an example in which the second in-vehicle device performs verification on the first data in an encryption key manner is used. A method for performing verification on the configuration information of the second in-vehicle device by the first in-vehicle device may include the following steps.

Step 301: The second in-vehicle device may generate the first verification information based on the first data and a first encryption key.

In another implementation of the first verification information, the first verification information may alternatively be a digital signature. Certainly, the first verification information may alternatively be another verification manner. Herein, only a data signature is used as an example for description.

For example, if the second in-vehicle device stores a private key for asymmetric encryption, the second in-vehicle device may sign a first random number and the first data based on the stored private key, to obtain the first verification information. The private key stored in the second in-vehicle device herein may be referred to as a first private key.

For another example, if the second in-vehicle device stores an encryption key for symmetric encryption, the second in-vehicle device may encrypt the first random number and the first data based on the stored encryption key, to obtain the first verification information.

Step 302: The second in-vehicle device sends the first verification information to the first in-vehicle device.

For a specific sending manner, refer to the embodiment shown in FIG. 2. Details are not described herein again.

Step 303: The first in-vehicle device performs verification on the first data based on the first verification information.

In an implementation of the first verification information, if the first verification information is the digital signature, for example, the first in-vehicle device may obtain a public key of a digital signature of the second in-vehicle device based on a certificate of the second in-vehicle device, that is, a first public key, and perform signature verification on the first verification information. If the verification succeeds, it may be determined that the first data is valid. For another example, if the first in-vehicle device stores a decryption key for symmetric encryption of the second in-vehicle device, the first in-vehicle device may decrypt the first verification information based on the stored decryption key, to perform verification on the first verification information. If the decryption succeeds, it is determined that the first verification information is successfully verified.

Further, the first in-vehicle device may further perform verification on integrity of the first data based on IDS configuration information of the second in-vehicle device that is stored in the first in-vehicle device. For example, a data integrity verification manner included in the IDS configuration information of the second in-vehicle device may include a hash function MD5, a digital signature SHA1, a cyclic redundancy check CRC32, or the like. A hash algorithm is used as an example. The second in-vehicle device may generate a first hash value based on the first data, and send the first hash value to the first in-vehicle device, to perform verification on the first data. The first in-vehicle device generates a second hash value based on the configuration information of the second in-vehicle device that is stored in the first in-vehicle device. If it is determined that the first hash value is consistent with the second hash value, it may be determined that the first data is successfully verified. If it is determined that the first hash value is inconsistent with the second hash value, it may be determined that the first data fails to be verified.

Figure 4:
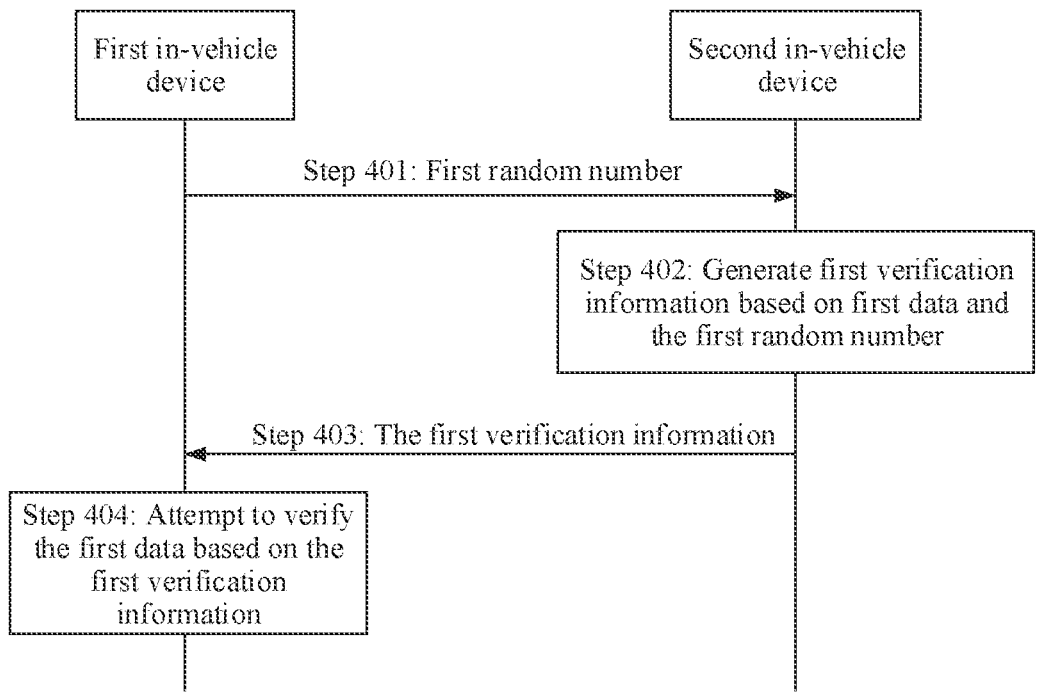
FIG. 4 is a flowchart of a data verification method according to an embodiment of this application.

FIG. 4 is a flowchart of an implementation of a data verification method according to an embodiment of this application. In the procedure shown in FIG. 4, an example in which the second in-vehicle device performs verification on the first data in a random number manner is used. A method for performing verification on the configuration information of the second in-vehicle device by the first in-vehicle device may include the following steps.

Step 401: The first in-vehicle device sends the first random number to the second in-vehicle device.

The first in-vehicle device may select a random number of an appropriate length, for example, referred to as the first random number, and the first random number may be represented by r. The first in-vehicle device may send r to the second in-vehicle device, and r may be used by the first in-vehicle device to perform verification on the second in-vehicle device. A length of r may be determined based on a verification strength. For example, if the verification strength is 128 bits, the length of r may be 128 bits. Generally, a stronger verification strength indicates a longer length of r. However, a longer length of r results in relatively high complexity of a verification process. Therefore, the length of r may be properly selected. Alternatively, the length of r may be specified in a protocol, or the like. This is not specifically limited.

Step 402. The second in-vehicle device may generate the first verification information based on the first random number and the first data.

In an implementation of the first verification information, the first verification information may alternatively be the digital signature. For example, if the second in-vehicle device stores the private key for asymmetric encryption, the second in-vehicle device may encrypt the first random number and the first data based on the stored private key, to obtain the first verification information. The private key stored in the second in-vehicle device herein may be referred to as the first private key. For another example, if the second in-vehicle device stores the encryption key for symmetric encryption, the second in-vehicle device may encrypt the first random number and the first data based on the stored encryption key, to obtain the first verification information.

In another implementation of the first verification information, the first verification information may include first sub-verification information and second sub-verification information. The first sub-verification information and the second sub-verification information may also be the digital signatures. For example, if the second in-vehicle device stores the private key for asymmetric encryption, the second in-vehicle device may sign the first random number based on the stored private key, to generate the first sub-verification information. The second in-vehicle device may sign the first data based on the stored private key, to generate the second sub-verification information, and further obtain the first verification information. The private key stored in the second in-vehicle device herein may be referred to as the first private key. For another example, if the second in-vehicle device stores the encryption key for symmetric encryption, the second in-vehicle device may separately encrypt the first random number and the first data based on the stored encryption key, to obtain the first sub-verification information and the second sub-verification information. Further, when the verification fails, it may be determined whether the first data is abnormal or the key is abnormal. In this way, security requirements of the verification are improved, and abnormal data can be restored based on an actual situation. For example, if it is determined that the first data is abnormal, the first data may be restored based on the configuration information of the second in-vehicle device that is stored in the another in-vehicle device.

Step 403: The second in-vehicle device sends the first verification information to the first terminal device.

For a specific sending manner, refer to the embodiment shown in FIG. 2. Details are not described herein again.

Step 404: The first in-vehicle device performs verification on the first data based on the first random number and the first verification information.

In an implementation of the first verification information, if the first verification information is the digital signature, for example, the first in-vehicle device may store the public key for asymmetric encryption of the second in-vehicle device, the first in-vehicle device may perform signature verification on the first verification information based on the first public key stored in the first in-vehicle device. If the verification succeeds, it may be determined that the first verification information is successfully verified.

For another example, if the first in-vehicle device stores the decryption key for symmetric encryption of the second in-vehicle device, the first in-vehicle device may decrypt the first verification information based on the stored decryption key, to perform verification on the first verification information. If the decryption succeeds, it is determined that the first verification information is successfully verified.

Further, the integrity of the first data may be further verified based on the first random number. For example, the verification manner may include the hash function MD5, the digital signature SHA1, the cyclic redundancy check CRC32, or the like. The hash algorithm is used as an example. The second in-vehicle device may generate the first hash value based on the first data and the first random number, and send the first hash value to the first in-vehicle device, to perform verification on the first data. The first in-vehicle device generates the second hash value based on the configuration information of the second in-vehicle device that is stored in the first in-vehicle device and the first random number. If it is determined that the first hash value is consistent with the second hash value, it may be determined that the first data is successfully verified. If it is determined that the first hash value is inconsistent with the second hash value, it may be determined that the first data fails to be verified.

In another implementation of the first verification information, the first verification information may include the first sub-verification information and the second sub-verification information. The first sub-verification information and the second sub-verification information may also be the digital signatures for description. The first in-vehicle device performs verification on the first sub-verification information based on the first random number and the decryption key of the second in-vehicle device that is stored in the first in-vehicle device. If it is determined that the first sub-verification information is successfully verified, it may be determined that an identity of the second in-vehicle device is valid. The first in-vehicle device performs verification on the second sub-verification information based on the configuration information of the second in-vehicle device that is stored in the first in-vehicle device and the decryption key of the second in-vehicle device that is stored in the first in-vehicle device. If it is determined that the second sub-verification information is successfully verified, it may be determined that the first data is successfully verified.

When the first verification sub-information fails to be verified, it may be determined that the encryption key of the second in-vehicle device is abnormal. In this case, if the decryption key stored in the first in-vehicle device is a key for symmetric encryption, the first in-vehicle device may send the decryption key of the second in-vehicle device that is stored in the first in-vehicle device, so that the second in-vehicle device restores the encryption key of the second in-vehicle device based on the decryption key of the second in-vehicle device that is stored in the first in-vehicle device.

When the first sub-verification information is successfully verified and the second sub-verification information fails to be verified, it may be determined that the first data is abnormal. In this case, the first data may be restored based on the configuration information of the second in-vehicle device that is stored in the first in-vehicle device, to improve security performance of the vehicle. Further, if the first in-vehicle device performs verification on the integrity of the first data and determines that the integrity of the first data is abnormal, in addition to that the first data may be abnormal, this may be caused by the IDS configuration information (for example, related information of the integrity verification manner for the first data) of the second in-vehicle device being abnormal. In this case, the first in-vehicle device may further restore the IDS configuration information of the second in-vehicle device by using the IDS configuration information of the second in-vehicle device that is stored in the first in-vehicle device, to improve vehicle security performance.

Figure 5:
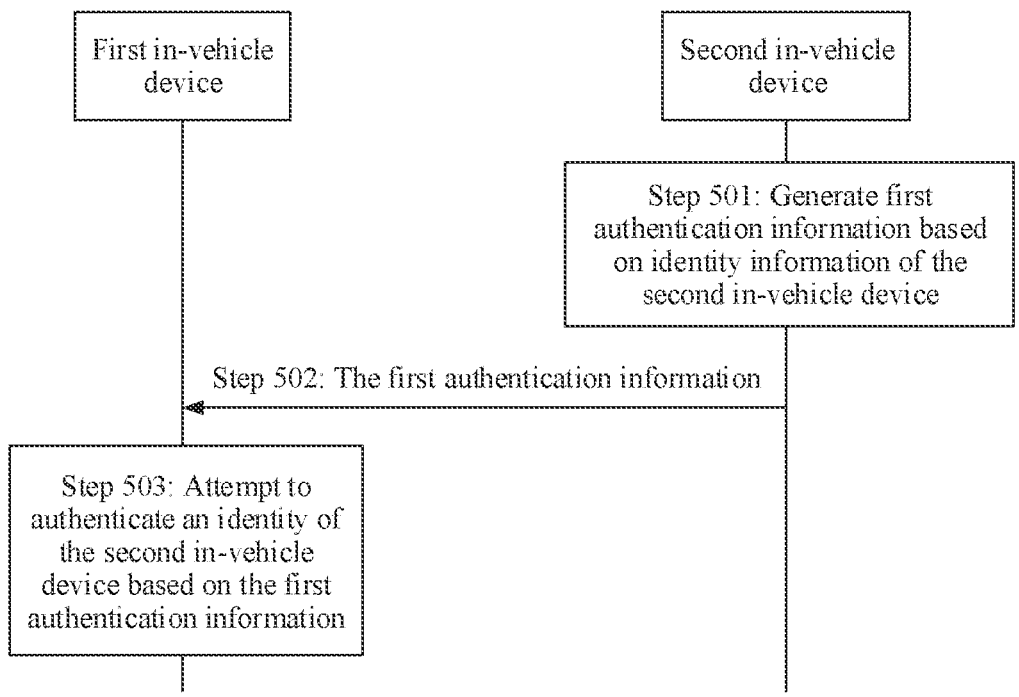
FIG. 5 is a flowchart of an identity authentication method according to an embodiment of this application.

To improve security of the first data, before performing verification on the first data, the first in-vehicle device may perform authentication on identity information of the second in-vehicle device. FIG. 5 is a flowchart of an implementation of an identity authentication method according to an embodiment of this application. In the procedure shown in FIG. 5, an example in which the first in-vehicle device performs authentication on the identity information of the second in-vehicle device is used. A method for performing authentication on the identity information of the second in-vehicle device by the first in-vehicle device may include the following steps.

Step 501: The second in-vehicle device generates first authentication information based on the identity information of the second in-vehicle device.

The identity information of the second in-vehicle device may include a serial number of the second in-vehicle device, or include an identity number (ID) of the second in-vehicle device, or may include other information that can uniquely identify the identity of the second in-vehicle device.

Manner a1: The first authentication information is obtained based on the identity information of the second in-vehicle device. Alternatively, the identity information of the second in-vehicle device is encrypted based on the private key stored in the second in-vehicle device, to obtain the first authentication information. Alternatively, the identity information of the second in-vehicle device is encrypted based on the encryption key for symmetric encryption stored in the second in-vehicle device, to obtain the first authentication information. In this way, when the first authentication information is authenticated, the first in-vehicle device may determine that the identity information of the second in-vehicle device is authenticated.

Manner a2: Before generating the first authentication information, the second in-vehicle device may further receive a second random number sent by the first in-vehicle device. In this way, the second in-vehicle device obtains the first authentication information based on the second random number and the identity information of the second in-vehicle device. Alternatively, the second in-vehicle device may encrypt the second random number and the identity information of the second in-vehicle device based on the stored private key, to obtain the first authentication information. Alternatively, the second random number and the identity information of the second in-vehicle device are encrypted based on the encryption key for symmetric encryption stored in the second in-vehicle device, to obtain the first authentication information.

Based on the first authentication information generated by using the foregoing method, the first in-vehicle device may perform authentication on the identity information of the second in-vehicle device based on a corresponding public key and the second random number, to improve identity authentication security.

Manner a3: Before generating the first authentication information, the second in-vehicle device may further receive the second random number of the first in-vehicle device. The first authentication information may include second authentication information and third authentication information.

The second in-vehicle device generates the second authentication information based on the second random number and the encryption key of the second in-vehicle device. The second in-vehicle device generates the third authentication information based on the identity information of the second in-vehicle device. Alternatively, the identity information of the second in-vehicle device is encrypted based on the private key stored in the second in-vehicle device, to obtain the third authentication information. Alternatively, the identity information of the second in-vehicle device is encrypted based on the encryption key for symmetric encryption stored in the second in-vehicle device, to obtain the third authentication information.

In this way, when the second authentication information fails to be authenticated, it may be determined that the encryption key of the second in-vehicle device may be tampered with, or the decryption key of the second in-vehicle device that is stored in the first in-vehicle device may be tampered with. When the first in-vehicle device determines that the third authentication information fails to be authenticated, it may be determined that the identity information of the second in-vehicle device may be tampered with, or identity information of the second in-vehicle device that is stored in the first in-vehicle device may be tampered with.

Step 502: The second in-vehicle device sends the first authentication information to the first in-vehicle device.

In a possible implementation, the first authentication information may be carried in the first message to be sent to the first in-vehicle device. In this case, the first in-vehicle device may perform authentication on the first authentication information or verify the first verification information based on the received first message. For example, in a possible scenario, the first in-vehicle device may send the first authentication information to another in-vehicle device in the first area, and perform authentication on the first authentication information by using the another in-vehicle device in the first area. When determining that the first authentication information is authenticated, the first in-vehicle device performs verification on the first verification information. Alternatively, the first in-vehicle device may first perform authentication on the first authentication information, and when determining that the first authentication information is authenticated, send the first verification information to another in-vehicle device that stores the configuration information of the second in-vehicle device, and perform verification on the first verification information by using another in-vehicle device that stores the configuration information of the second in-vehicle device. When determining that the first authentication information is authenticated, the first in-vehicle device performs verification on the first verification information. When the first in-vehicle device needs to perform verification one plurality of in-vehicle devices at the same time, the foregoing method can improve efficiency of performing verification on configuration information of the in-vehicle devices by the vehicle.

In another possible implementation, before sending the first message, the second in-vehicle device sends a second message to the first in-vehicle device, where the second message includes the first authentication information. In this case, the first in-vehicle device may perform authentication on the first authentication information, and receive the first verification information of the second in-vehicle device when determining that the first authentication information is authenticated, to save a redundant verification process and improve verification efficiency.

Step 503: The first in-vehicle device performs authentication on the identity of the second in-vehicle device based on the first authentication information.

Corresponding to Manner a1, the first in-vehicle device may perform authentication on the first authentication information based on the identity information of the second in-vehicle device that is stored in the first in-vehicle device. Alternatively, the first in-vehicle device performs signature authentication on the first authentication information based on the public key of the second in-vehicle device that is stored in the first in-vehicle device. If the authentication succeeds, it is determined that the identity of the first in-vehicle device is valid: or if the authentication fails, it is determined that the identity of the first in-vehicle device is invalid. Alternatively, the first in-vehicle device decrypts the first authentication information based on a decryption key for symmetric encryption that is of the second in-vehicle device and that is stored in the first in-vehicle device. If the decryption succeeds, it is determined that the first authentication information is authenticated; or if the decryption fails, it is determined that the first authentication information fails to be authenticated.

Further, after the first authentication information is successfully decrypted, integrity of the identity information of the second in-vehicle device in the first authentication information may be further verified. For a specific verification manner, refer to the integrity verification of the first data. Details are not described herein again. When the integrity of the identity information of the second in-vehicle device is successfully verified, it is determined that the first authentication information is authenticated.

Corresponding to Manner a2, the first in-vehicle device performs authentication on the first authentication information based on the second random number. Alternatively, the first in-vehicle device may decrypt the first authentication information based on the public key of the second in-vehicle device that is stored in the first in-vehicle device. If it is determined that the decryption succeeds, integrity verification may be performed on the second random number and the identity information of the second in-vehicle device in the first authentication information. If it is determined that the verification succeeds, it is determined that the first authentication information is authenticated. Alternatively, the first in-vehicle device may decrypt the first authentication information based on the decryption key for symmetric encryption that is of the second in-vehicle device and that is stored in the first in-vehicle device. If it is determined that the decryption succeeds, integrity verification may be performed on the second random number and the identity information of the second in-vehicle device in the first authentication information. If it is determined that the verification succeeds, it is determined that the first authentication information is authenticated.

Corresponding to Manner a3, the first in-vehicle device performs authentication on the second authentication information based on the second random number and the decryption key of the second in-vehicle device. The first in-vehicle device performs authentication on the third authentication information based on identity information of the first in-vehicle device. Alternatively, the first in-vehicle device decrypts the third authentication information based on the public key of the second in-vehicle device that is stored in the first in-vehicle device, to perform authentication on the third authentication information. Alternatively, the first in-vehicle device decrypts the third authentication information based on the decryption key for symmetric encryption stored in the first in-vehicle device, to perform authentication on the third authentication information.

When the first in-vehicle device determines that the second authentication information fails to be authenticated, it may be determined that the encryption key of the second in-vehicle device may be tampered with, or the decryption key of the second in-vehicle device that is stored in the first in-vehicle device may be tampered with. When the first in-vehicle device determines that the third authentication information fails to be authenticated, it may be determined that the identity information of the second in-vehicle device may be tampered with, or the identity information of the second in-vehicle device that is stored in the first in-vehicle device may be tampered with.

It should be noted that, to improve verification efficiency of the first data and reduce verification complexity, the second random number may be the same as the first random number. For example, the first in-vehicle device may send the first random number to the second in-vehicle device, and the second in-vehicle device generates the first authentication information by using the first random number and the identity information of the second in-vehicle device. The second in-vehicle device generates the first verification information based on the first random number and the first data.

According to the foregoing method, the first in-vehicle device may perform verification on the first verification information after the first in-vehicle device determines, based on the first authentication information, that the identity of the second in-vehicle device is authenticated. Therefore, verification is performed on the first data while ensuring validity of the identity of the second in-vehicle device, thereby improving security of the first data.

Figure 6:
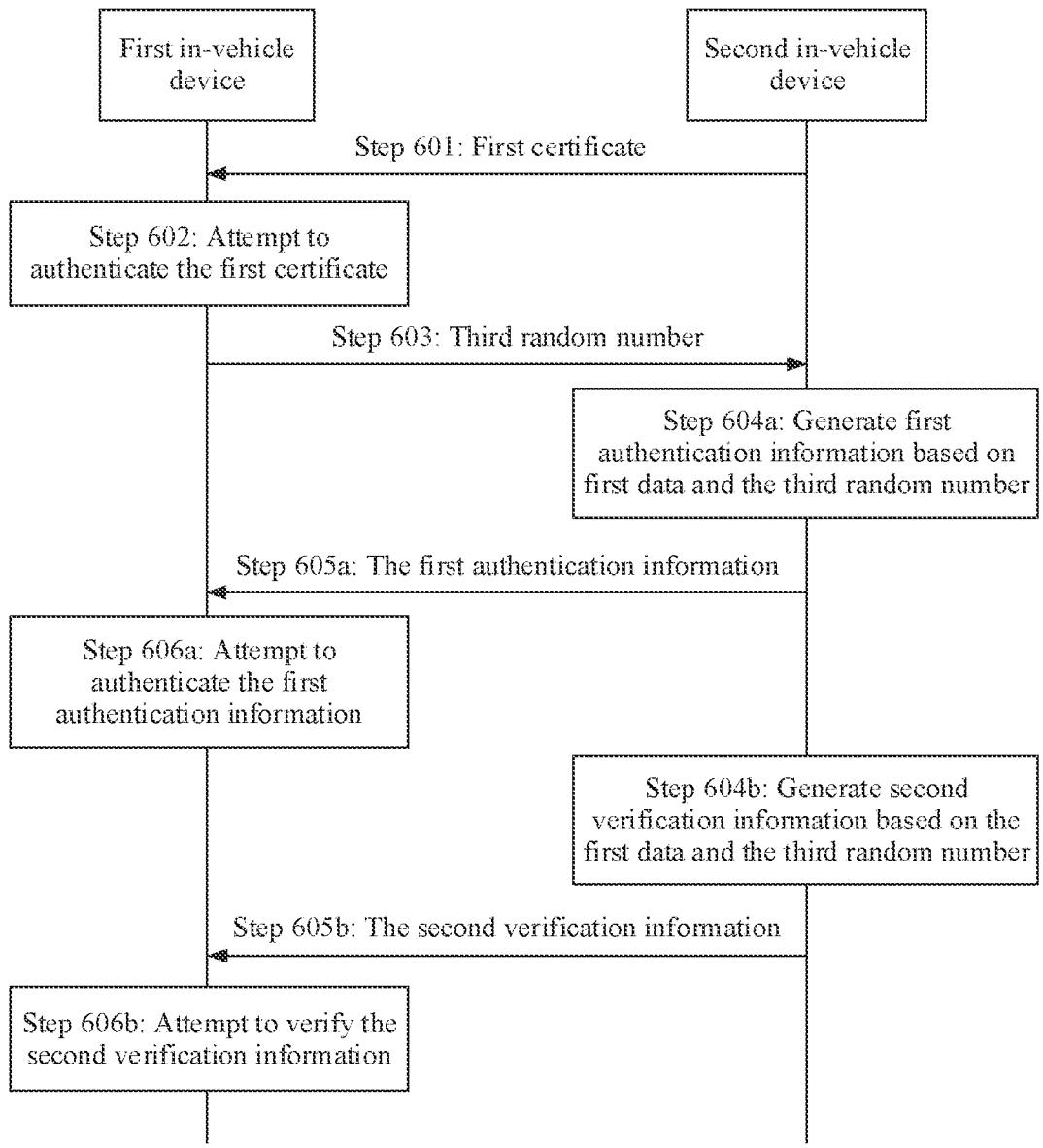
FIG. 6 is a flowchart of a data verification method according to an embodiment of this application.

FIG. 6 is a flowchart of an implementation of a data verification method according to an embodiment of this application. In the procedure shown in FIG. 6, an example in which the first in-vehicle device performs authentication on the identity information of the second in-vehicle device is used. A method for performing authentication on the identity information of the second in-vehicle device by the first in-vehicle device may include the following steps.

Step 601: The second in-vehicle device sends a first certification of the second in-vehicle device to the first in-vehicle device.

In a possible implementation, the first certificate may be carried in the first authentication information, or may be separately sent. This is not limited herein. The first certificate may be a PKI certificate generated based on the identity information of the second in-vehicle device.

Step 602: The first in-vehicle device performs verification on the first certificate based on a root certificate that is of the first certificate and that is stored in the first in-vehicle device.

The root certificate of the first certificate may be pre-stored by the first in-vehicle device as the configuration information of the second in-vehicle device, or may be separately stored by the first in-vehicle device to improve security. This is not limited herein.

Step 603: If determining that the first certificate is successfully verified, the first in-vehicle device sends a third random number to the second in-vehicle device.

Step 604a: The second in-vehicle device generates the first authentication information based on the third random number and the identity information of the second in-vehicle device. Manners of generating the first authentication information are described below by using Manner b1 and Manner b2 as examples.

Manner b1: The second in-vehicle device obtains the first authentication information based on the third random number and the identity information of the second in-vehicle device. Alternatively, the second in-vehicle device may encrypt the third random number and the identity information of the second in-vehicle device based on the stored private key, to obtain the first authentication information. Alternatively, the third random number and the identity information of the second in-vehicle device are encrypted based on the encryption key for symmetric encryption stored in the second in-vehicle device, to obtain the first authentication information.

Manner b2: The first authentication information includes the second authentication information and the third authentication information.

The second in-vehicle device generates the second authentication information based on the third random number and the encryption key of the second in-vehicle device. The second in-vehicle device generates the third authentication information based on the identity information of the second in-vehicle device. Alternatively, the identity information of the second in-vehicle device is encrypted based on the private key stored in the second in-vehicle device, to obtain the third authentication information. Alternatively, the identity information of the second in-vehicle device is encrypted based on the encryption key for symmetric encryption stored in the second in-vehicle device, to obtain the third authentication information.

Step 605a: The second in-vehicle device sends the first authentication information to the first in-vehicle device, to perform authentication on the first authentication information.

In a possible implementation, the first authentication information may be carried in the first message to be sent to the first in-vehicle device. In another possible implementation, before sending the first message, the second in-vehicle device sends the second message to the first in-vehicle device, where the second message includes the first authentication information.

Step 606a: The first in-vehicle device performs authentication on the identity of the second in-vehicle device based on the first authentication information.

Corresponding to Manner b1, the first in-vehicle device performs authentication on the first authentication information based on the third random number. Alternatively, the first in-vehicle device may decrypt the first authentication information based on the public key of the second in-vehicle device that is stored in the first in-vehicle device. If it is determined that the decryption succeeds, integrity verification may be performed on the third random number and the identity information of the second in-vehicle device in the first authentication information. If it is determined that the verification succeeds, it is determined that the first authentication information is authenticated. Alternatively, the first in-vehicle device may decrypt the first authentication information based on the encryption key for symmetric encryption of the second in-vehicle device that is stored in the first in-vehicle device. If it is determined that the decryption succeeds, integrity verification may be performed on the third random number and the identity information of the second in-vehicle device in the first authentication information. If it is determined that the verification succeeds, it is determined that the first authentication information is authenticated.

Further, after the first authentication information is successfully decrypted, the integrity of the identity information of the second in-vehicle device in the first authentication information may be further verified. For a specific verification manner, refer to the integrity verification of the first data. Details are not described herein again. When the integrity of the identity information of the second in-vehicle device is successfully verified, it is determined that the first authentication information is authenticated.

Corresponding to Manner b2, the first in-vehicle device may perform authentication on the third authentication information based on the identity information of the second in-vehicle device that is stored in the first in-vehicle device. Alternatively, the first in-vehicle device decrypts the second authentication information or the third authentication information based on the public key of the second in-vehicle device that is stored in the first in-vehicle device. If the decryption succeeds, it is determined that the second authentication information or the third authentication information is authenticated; or if the decryption fails, it is determined that the second authentication information or the third authentication information fails to be authenticated. Alternatively, the first in-vehicle device decrypts the second authentication information or the third authentication information based on the decryption key for symmetric encryption that is of the second in-vehicle device and that is stored in the first in-vehicle device. If the decryption succeeds, it is determined that the third authentication information is authenticated: or if the decryption fails, it is determined that the second authentication information or the third authentication information fails to be authenticated.

When the first in-vehicle device determines that the second authentication information fails to be authenticated, it may be determined that the encryption key of the second in-vehicle device may be tampered with, or the decryption key of the second in-vehicle device that is stored in the first in-vehicle device may be tampered with. When the first in-vehicle device determines that the third authentication information fails to be authenticated, it may be determined that the identity information of the second in-vehicle device may be tampered with, or the identity information of the second in-vehicle device that is stored in the first in-vehicle device may be tampered with.

In another possible manner, the third random number may be used to generate second verification information, so that the first in-vehicle device performs verification on the first data after successfully verifying the identity of the second in-vehicle device.

Step 604b: The second in-vehicle device generates the second verification information based on the third random number and the first data.

For a specific manner of generating the second verification information, refer to the manner of generating the first verification information by the second in-vehicle device based on the first random number and the first data. Details are not described herein again.

Step 605b: The second in-vehicle device sends the second verification information to the first in-vehicle device.

For a specific manner of sending the second verification information, refer to the manner of sending the first verification information after the second in-vehicle device generates the first verification information based on the first random number and the first data. Details are not described herein again.

Step 606b: The first in-vehicle device performs verification on second data based on the first verification information and the third random number.

For a manner in which the first in-vehicle device performs verification on the first data based on the second verification information and the third random number, refer to the manner in which the first in-vehicle device performs verification on the first data based on the first verification information and the first random number. Details are not described herein again.

Figure 7:
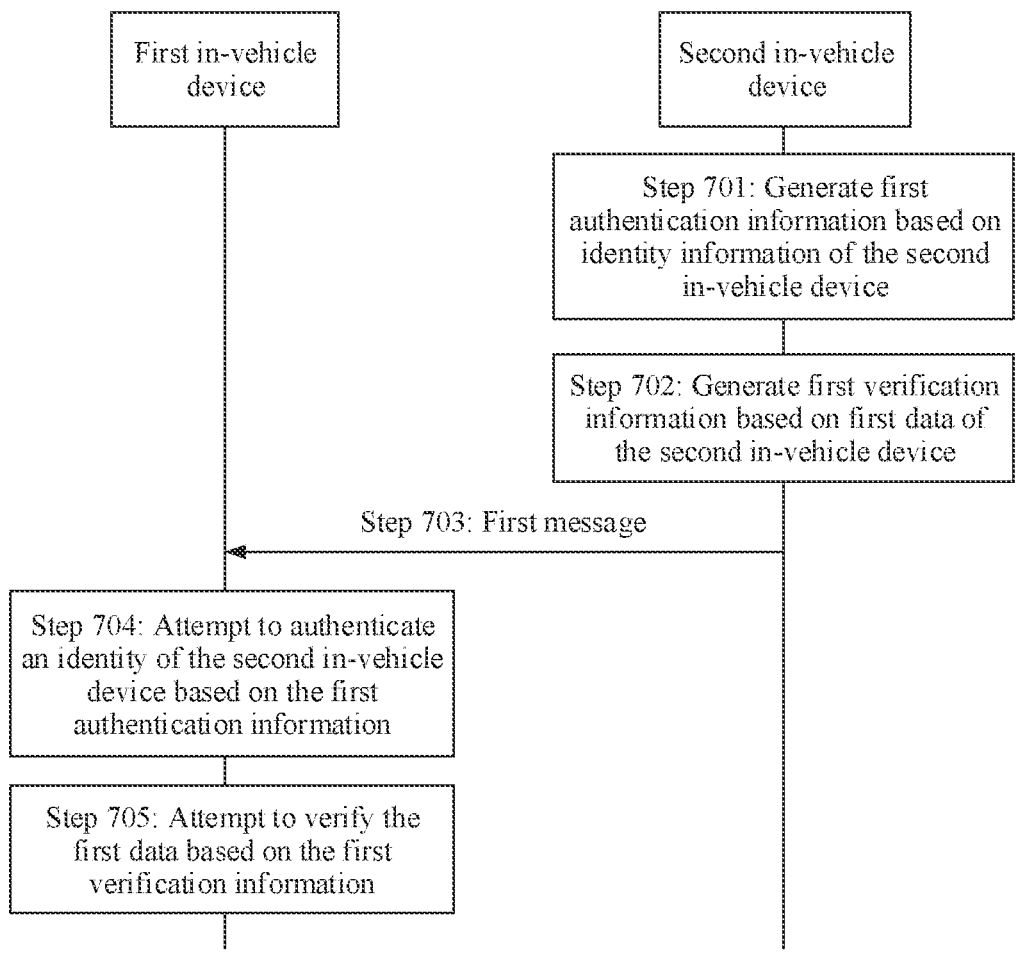
FIG. 7 is a flowchart of a data verification method according to an embodiment of this application.
Figure 8:
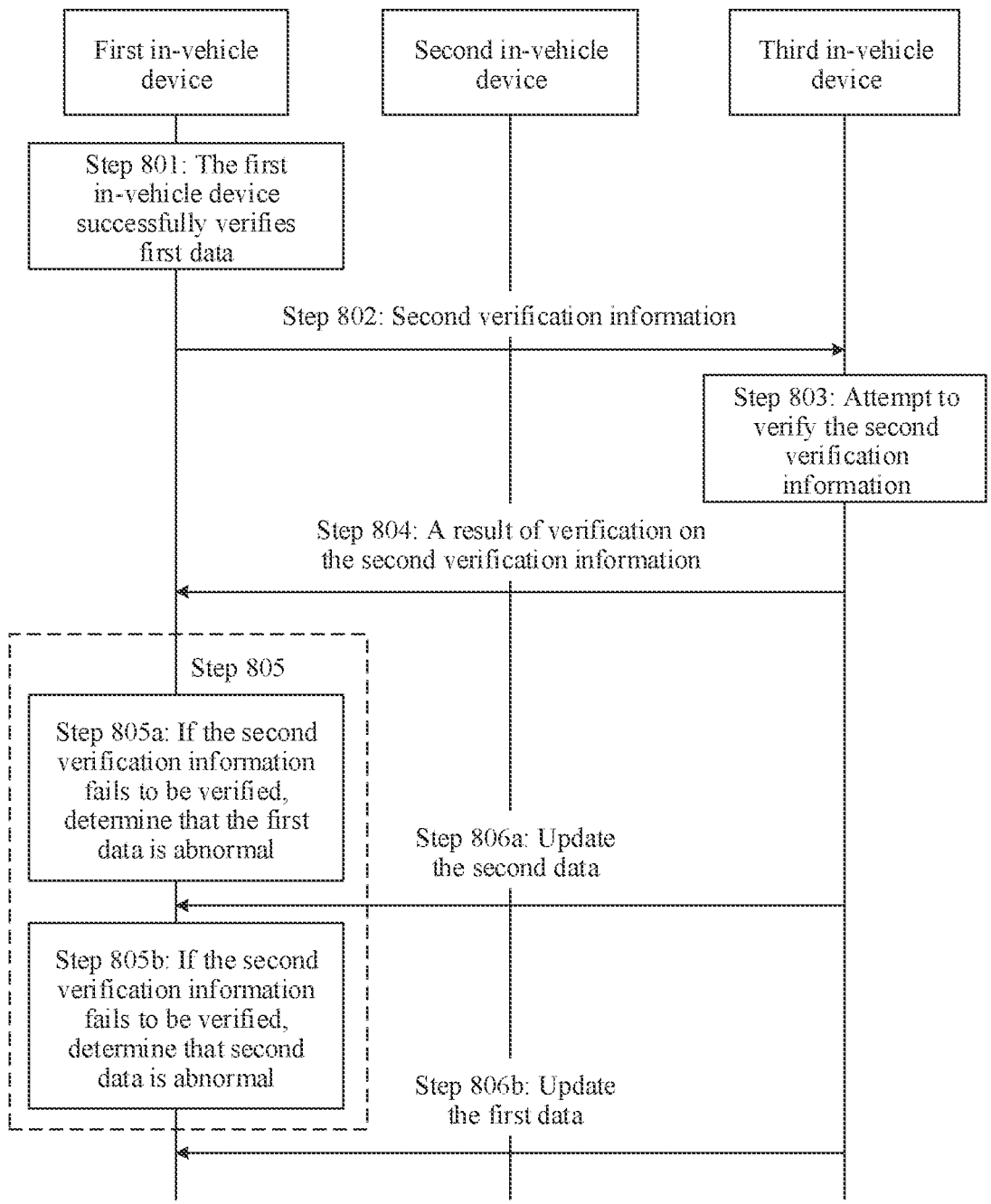
FIG. 8 is a flowchart of a data verification method according to an embodiment of this application.
Figure 9:
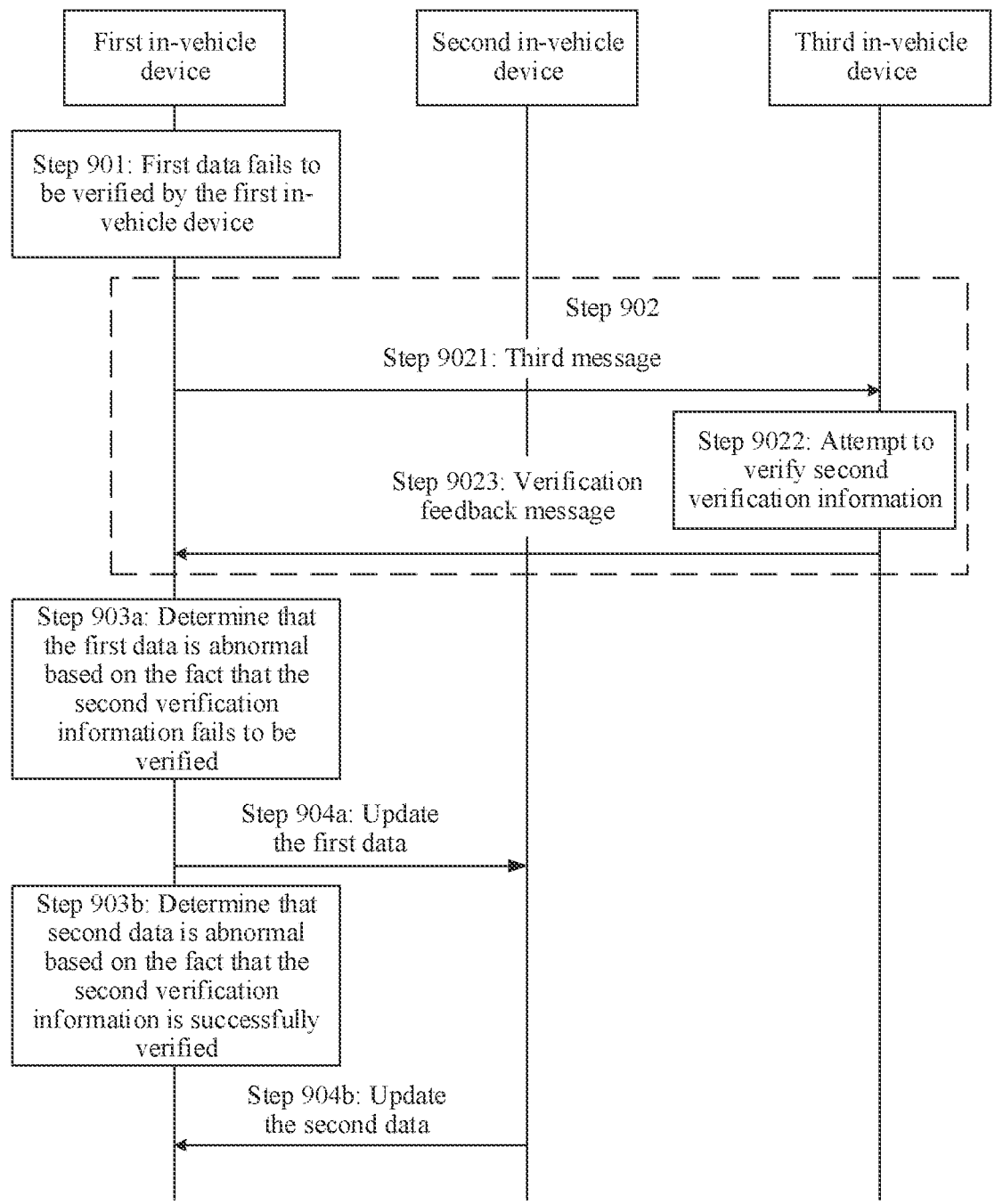
FIG. 9 is a flowchart of a data verification method according to an embodiment of this application.
Figure 10:
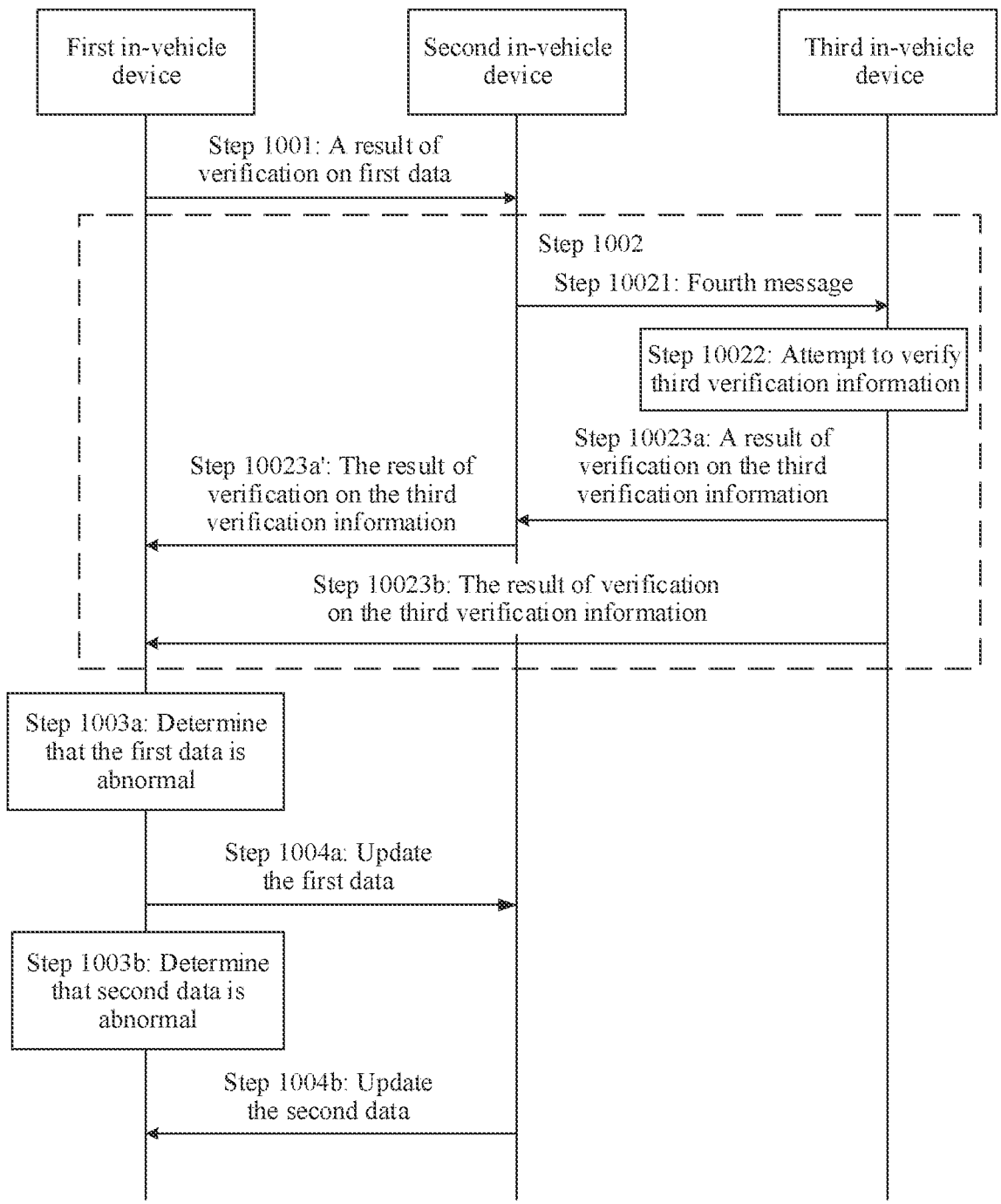
FIG. 10 is a flowchart of a data verification method according to an embodiment of this application.

FIG. 7 is a flowchart of an implementation of a data verification method according to an embodiment of this application. In the procedure shown in FIG. 7, an example in which the first in-vehicle device performs verification on the first data in the second in-vehicle device after performing authentication on the identity information of the second in-vehicle device is used. The following steps may be included:

Step 701: The second in-vehicle device generates the first authentication information based on the identity information of the second in-vehicle device.

In Step 701, for a manner in which the second in-vehicle device generates the first authentication information, refer to the implementation in FIG. 5, or refer to the manner in which the first authentication information is generated in FIG. 6. Details are not described herein again.

Step 702: The second in-vehicle device may generate the first verification information based on the first data.

In Step 702, for a specific implementation in which the second in-vehicle device generates the first verification information, refer to the implementation in FIG. 3, or refer to the implementation in which the first verification information is generated in FIG. 4. This is not limited herein. Alternatively, the second in-vehicle device may generate the first verification information in the manner in FIG. 6. Details are not described herein again.

Step 703: The second in-vehicle device sends the first message to the first in-vehicle device.

The first message includes the first verification information and the first authentication information.

Step 704: The first in-vehicle device performs authentication on the identity of the second in-vehicle device based on the first authentication information.

In Step 704, for a specific implementation in which the first in-vehicle device performs authentication on the first authentication information, refer to the implementations in FIG. 5 and FIG. 6. Details are not described herein again.

Step 705: The first in-vehicle device performs verification on the first data of the second in-vehicle device based on the first verification information.

In Step 705, for a specific implementation in which the second in-vehicle device performs verification on the first verification information, refer to the implementation in FIG. 3, or refer to the implementation in which verification is performed on the first verification information in FIG. 4. This is not limited herein. Alternatively, the second in-vehicle device may perform verification on the first verification information in the manner in FIG. 6. Details are not described herein again.

In addition, it should be noted that the description process of the embodiment shown in FIG. 2 may be performed on a premise that the first in-vehicle device is trustworthy, and authenticity or regularity of the first in-vehicle device does not need to be verified. Actually, authentication may further be performed on the first in-vehicle device, to further improve security. There are many methods that can implement authentication on the first in-vehicle device. For example, authentication may be performed on the identity information of the first in-vehicle device by using another in-vehicle device, or configuration information stored in the first in-vehicle device may be verified by using another in-vehicle device. An asymmetric key mechanism (for example, a digital signature) may be used in the authentication on the first in-vehicle device.

For example, to improve a verification effect, in addition to the second in-vehicle device, the first vehicle may further include a third in-vehicle device. If the third in-vehicle device also stores the configuration information of the second in-vehicle device, the third in-vehicle device may also be used as a verification node of the configuration information of the second in-vehicle device. In this case, verification on the configuration information of the second in-vehicle device may be performed by using the first in-vehicle device and the second in-vehicle device.

In a possible implementation, the first in-vehicle device, the second in-vehicle device, and the third in-vehicle device are located in different areas. For example, the first in-vehicle device is the first gateway, the second in-vehicle device is the second gateway, and the third in-vehicle device is the third gateway. Alternatively, some of the first in-vehicle device, the second in-vehicle device, and the third in-vehicle device are located in a same area. For example, the first in-vehicle device is the first gateway, the second in-vehicle device is a first ECU, and the third in-vehicle device is the second gateway. In another possible implementation, the first in-vehicle device, the second in-vehicle device, and the third in-vehicle device are located in a same area. The first area may include one to-be-verified in-vehicle device (the second in-vehicle device), and may further include an in-vehicle device (for example, the third in-vehicle device) as a verification node. For example, the first area may include the second in-vehicle device and the third in-vehicle device, the second in-vehicle device may be a to-be-verified node in the first area, and the third in-vehicle device may be a verification node used to perform verification on the second in-vehicle device. There may be one or more third in-vehicle devices in the first area.

For example, if the first in-vehicle device successfully verifies the first data of the second in-vehicle device, the first in-vehicle device may consider that the first data of the second in-vehicle device is normal. However, if the first in-vehicle device fails to verify the first data of the second in-vehicle device (or the first data fails to be verified), the first in-vehicle device may consider that the first data of the second in-vehicle device is abnormal.

The following uses Case 1 to Case 3 as examples to describe possible verification manners based on different verification results of the first data.

Case 1: The first in-vehicle device determines that the first in-vehicle device successfully verifies the first data.

In this case, provided that the first in-vehicle device determines that the first verification information is successfully verified, the process of performing verification on the second in-vehicle device may end. In this case, it is considered that identities of both the second in-vehicle device and at least one intra-domain device in the first area are successfully verified.

In another possible scenario, the first vehicle includes a fourth in-vehicle device, and the first in-vehicle device stores configuration information of the fourth in-vehicle device. In a process in which the first in-vehicle device performs verification on the second in-vehicle device, another in-vehicle device may perform verification on the configuration information of the fourth in-vehicle device that is stored in the first in-vehicle device. If it is determined that the configuration information of the fourth in-vehicle device that is stored in the first in-vehicle device fails to be verified, there is a risk that the configuration information stored in the first in-vehicle device may be tampered with, that is, there is a possibility that the configuration information of the second in-vehicle device that is stored in the first in-vehicle device is tampered with. In this case, the first in-vehicle device may perform verification on, by using the third in-vehicle device, the configuration information of the second in-vehicle device that is stored in the first in-vehicle device. In this scenario, referring to FIG. 8, in the embodiment shown in FIG. 8, that the third in-vehicle device performs verification on the configuration information of the second in-vehicle device that is stored in the first in-vehicle device may include the following steps:

Step 801: The first in-vehicle device determines, based on a result of verification performed by the first in-vehicle device on the first data, that the first data is successfully verified by the first in-vehicle device.

Step 802: The first in-vehicle device sends the second verification information to the third in-vehicle device, and the second verification information is used to perform verification on the second data. The second data is the configuration information of the second in-vehicle device that is stored in the first in-vehicle device.

For the first in-vehicle device, if the configuration information of the second in-vehicle device is known, the first in-vehicle device may generate, in a manner the same as that in which the second in-vehicle device generates the first verification information, the second verification information to be sent to the third in-vehicle device.

For example, the first in-vehicle device may generate the second verification information based on the configuration information of the second in-vehicle device that is stored in the first in-vehicle device and a fourth random number. The fourth random number may be sent by the third in-vehicle device to the first in-vehicle device.

Further, the first in-vehicle device may send the second authentication information of the first in-vehicle device to the third in-vehicle device, where the second authentication information may be used to authenticate the identity of the first in-vehicle device.

In an implementation of sending the second verification information, the first in-vehicle device may send the second message to the third in-vehicle device, where the second message carries the second verification information. Alternatively, the second authentication information for performing verification on the identity information of the first in-vehicle device may be carried in the second message, so that the first in-vehicle device may generate the second authentication information in a manner the same as that in which the second in-vehicle device generates the first authentication information.

Step 803: The third in-vehicle device performs verification on the second data based on configuration information of the second in-vehicle device that is stored in the third in-vehicle device and the second verification information.

For a specific verification process, refer to a process in which the first in-vehicle device performs verification on the first data. Details are not described herein again.

Step 804: The first in-vehicle device obtains a result of verification performed by the third in-vehicle device on the second data.

The first in-vehicle device may determine, based on the result that is of the verification on the second verification information and that is fed back by the third in-vehicle device, whether the configuration information of the second in-vehicle device that is stored in the first in-vehicle device is abnormal. If the second verification information is successfully verified, the configuration information of the second in-vehicle device that is stored in the first in-vehicle device is successfully verified. In other words, the third in-vehicle device determines that the configuration information of the second in-vehicle device that is stored in the first in-vehicle device is successfully verified. Alternatively, if the second verification information fails to be verified, the configuration information of the second in-vehicle device that is stored in the first in-vehicle device fails to be verified. In other words, the third in-vehicle device determines that the configuration information of the second in-vehicle device that is stored in the first in-vehicle device fails to be verified.

For a manner in which the third in-vehicle device performs verification on the second verification information, refer to the manner in which the first in-vehicle device performs verification on the first verification information. Details are not described herein again.

Step 805: The first in-vehicle device determines, based on the result of verification performed by the third in-vehicle device on the second data, whether the second data or the first data is abnormal.

In a possible implementation, if the first in-vehicle device determines that the result of verification performed by the third in-vehicle device on the second data is that the verification succeeds, it may be determined that the configuration information of the second in-vehicle device that is stored in the first in-vehicle device is not abnormal. In this case, it may also be determined that the first data is not abnormal.

In another possible implementation, in Step 805a, if the first in-vehicle device determines that the result of verification performed by the third in-vehicle device on the second data is that the verification fails, it may be determined that the configuration information of the second in-vehicle device that is stored in the first in-vehicle device is abnormal. It may also be determined, based on a result indicating that the first in-vehicle device successfully verifies the first data, the first data is abnormal.

It should be noted that, to ensure reliability of verification performed by the third in-vehicle device, the first in-vehicle device may further perform verification on the second data based on another in-vehicle device, to determine whether the second data stored in the first in-vehicle device and the first data stored in the second in-vehicle device are abnormal data.

Further, in Step 805b, if the first in-vehicle device determines that the result of verification performed by the third in-vehicle device on the second data is that the verification fails, it may be determined that the second data is abnormal. When it is determined that the second data is abnormal, the second data may be restored based on normal data stored in another in-vehicle device. For example, the configuration information of the second in-vehicle device that is stored in the third in-vehicle device is normal data. In this case, the first in-vehicle device may restore the second data based on the configuration information of the second in-vehicle device that is stored in the third in-vehicle device. Specific Step 806a may include: The first in-vehicle device obtains the configuration information of the second device that is stored in the third in-vehicle device, and the first in-vehicle device updates the second data based on the configuration information of the second device that is stored in the third in-vehicle device.

Similarly, the second in-vehicle device may restore the first data based on the configuration information of the second in-vehicle device that is stored in the third in-vehicle device. Specific Step 806b may include: The second in-vehicle device obtains the configuration information of the second in-vehicle device that is stored in the third in-vehicle device, and the second in-vehicle device updates the first data based on the configuration information of the second in-vehicle device that is stored in the third in-vehicle device.

Case 2: When the first in-vehicle device determines that the first data fails to be verified by the first in-vehicle device, the configuration information of the second in-vehicle device that is stored in the first in-vehicle device may be abnormal, or the first data stored in the second in-vehicle device may be abnormal. Therefore, the second data may be verified by using the third in-vehicle device. In this scenario, referring to FIG. 9, in the embodiment shown in FIG. 9, that the third in-vehicle device performs verification on the configuration information of the second in-vehicle device that is stored in the first in-vehicle device may include the following steps:

Step 901: The first in-vehicle device determines that the first data fails to be verified by the first in-vehicle device.

That the first data fails to be verified may be determined after verification is performed on the first data in the first verification data after the first authentication information is authenticated. For example, if the first verification data is the digital signature, it may be determined that the first verification information fails to be verified when decryption of the digital signature fails. Alternatively, it may be determined that the first data fails to be verified when decryption of the digital signature succeeds, but integrity verification is performed on the decrypted first data. This is not limited herein.

In another possible implementation, that the first data fails to be authenticated may also be directly determined based on the fact that the first authentication information fails to be authenticated. When it is determined that the first authentication information fails to be authenticated, and it is determined that the identity of the second in-vehicle device is invalid, it may be directly considered that the first data stored in the second in-vehicle device is abnormal, and the first in-vehicle device does not need to perform verification on the first verification information.

Step 902: The first in-vehicle device obtains the result of verification performed by the third in-vehicle device on the second data.

There may be a plurality of implementations in which the first in-vehicle device obtains the result of verification performed by the third in-vehicle device on the second data. The following uses examples for description, and the implementations may include:

Step 9021: The first in-vehicle device sends a third message to the third in-vehicle device.

The third message includes the second verification information, the second verification information is used to perform verification on the second data, and the second data is the configuration information of the second in-vehicle device that is stored in the first in-vehicle device.

Further, the third message may further include the second authentication information used by the third in-vehicle device to authenticate the identity information of the first in-vehicle device. For a specific manner of generating the second authentication information, refer to the manner of generating the first authentication information by the second in-vehicle device. Details are not described herein again.

Step 9022: The third in-vehicle device performs verification on the second verification information.

For a manner in which the third in-vehicle device performs verification on the second verification information, refer to the manner in which the first in-vehicle device performs verification on the first verification information. Details are not described herein again. Correspondingly, if the third message includes the second authentication information, the third in-vehicle device may further perform authentication on the identity information of the first in-vehicle device. For a specific authentication manner, refer to the manner in which the first in-vehicle device performs authentication on the identification information of the second in-vehicle device. Details are not described herein again.

Step 9023: The third in-vehicle device sends a verification feedback message to the first in-vehicle device.

Correspondingly, the first in-vehicle device receives the verification feedback message from the third in-vehicle device, where the verification feedback message includes the result of verification performed by the third in-vehicle device on the second data.

Further, after the third in-vehicle device performs authentication on the identity information of the first in-vehicle device, the verification feedback message may further include a result of authentication performed by the third in-vehicle device on the identity information of the first in-vehicle device. The first in-vehicle device may determine, based on both the result of authentication on the identity information of the first in-vehicle device and the result of verification on the second data, whether the second data is successfully verified by the third in-vehicle device.

In another possible implementation, to improve verification efficiency, the result of verification performed by the third in-vehicle device on the second data may alternatively be determined based on the result of authentication on the identity information of the first in-vehicle device. For example, if it is determined that the result of authentication performed by the third in-vehicle device on the identity information of the first in-vehicle device is that the authentication fails, that is, it is determined that the identity information of the first in-vehicle device is invalid, it may be directly determined that the result of verification on the second data is that the verification fails. If it is determined that the result of authentication performed by the third in-vehicle device on the identity information of the first in-vehicle device is that the authentication succeeds, it may be determined, based on whether the result of verification performed by the third in-vehicle device on the second data is that the verification succeeds, whether the verification on the second data succeeds.

In the following Steps 903a to 904b, the first in-vehicle device may determine, based on the result of verification performed by the third in-vehicle device on the second data, whether the second data or the first data is abnormal.

Step 903a: The first in-vehicle device determines, based on the result of verification performed by the third in-vehicle device on the second data, that the second data is successfully verified by the third in-vehicle device; and the first in-vehicle device may determine that the first data is abnormal and the second data is not abnormal.

Step 904a: The first in-vehicle device may restore, based on the second data, the first data stored in the second in-vehicle device to normal data. This may specifically include: The first in-vehicle device sends the second data to the second in-vehicle device; and the second in-vehicle device updates the first data based on the second data.

Step 903b: If the first in-vehicle device determines, based on the result of verification performed by the third in-vehicle device on the second data, that the result of verification performed by the third in-vehicle device on the second data is that the verification fails, the first in-vehicle device may determine that the first data is not abnormal and the second data is abnormal.

Step 904b: The first in-vehicle device may restore, based on the first data of the second in-vehicle device, the second data stored in the first in-vehicle device to normal data. This may specifically include: The second in-vehicle device sends the first data to the first in-vehicle device; and the first in-vehicle device updates the second data based on the first data.

Case 3: When the first in-vehicle device determines that the first data fails to be verified by the first in-vehicle device, the configuration information of the second in-vehicle device that is stored in the first in-vehicle device may be abnormal, or the first data stored in the second in-vehicle device may be abnormal. Therefore, the first data may be verified by using the third in-vehicle device. In this scenario, referring to FIG. 10, in the embodiment shown in FIG. 10, that the third in-vehicle device performs verification on the configuration information of the second in-vehicle device that is stored in the second in-vehicle device may include the following steps:

Step 1001: The second in-vehicle device receives the result of verification performed by the first in-vehicle device on the first data, and determines, based on the result of verification on the first data, that the first data fails to be verified.

For specific content of the verification failure, refer to step 901. Details are not described herein again.

Step 1002: The second in-vehicle device obtains a result of verification performed by the third in-vehicle device on the first data.

There may be a plurality of implementations in which the second in-vehicle device obtains the result of verification performed by the third in-vehicle device on the first data. The following uses examples for description, and the implementations may include:

Step 10021: The second in-vehicle device sends a fourth message to the third in-vehicle device.

The fourth message includes the third verification information, and the third verification information is used to perform verification on the first data.

Further, the fourth message may further include the third authentication information used by the third in-vehicle device to authenticate the identity information of the second in-vehicle device. For a specific manner of generating the third authentication information, refer to the manner of generating the first authentication information by the second in-vehicle device. Details are not described herein again.

Step 10022: The third in-vehicle device performs verification on the third verification information.

For a manner in which the third in-vehicle device performs verification on the third verification information, refer to the manner in which the first in-vehicle device performs verification on the first verification information. Details are not described herein again. Correspondingly, if the third message includes the third authentication information, the third in-vehicle device may further perform authentication on the identity information of the second in-vehicle device. For a specific authentication manner, refer to the manner in which the first in-vehicle device performs authentication on the identification information of the second in-vehicle device. Details are not described herein again.

Step 10023a: The third in-vehicle device sends the verification feedback message to the second in-vehicle device.

Correspondingly, the second in-vehicle device receives the verification feedback message from the third in-vehicle device, where the verification feedback message includes the result of verification performed by the third in-vehicle device on the first data.

There may be a plurality of manners in which the first in-vehicle device obtains a result of verification performed by the third in-vehicle device on the third verification information. The following uses Manner 1 and Manner 2 as examples for description.

Manner 1

Step 10023a': After receiving the verification feedback message, the second in-vehicle device may send the verification feedback message to the first in-vehicle device, where the verification feedback message includes the result of verification performed by the third in-vehicle device on the first data. Further, the first in-vehicle device may determine the result of verification performed by the third in-vehicle device on the first data.

Manner 2

Step 10023b: The third in-vehicle device sends the result of verification on the third verification information to the first in-vehicle device.

In a possible implementation, in step 10021, the fourth message may further carry a request by the first in-vehicle device for obtaining the result of verification on the third verification information. In this way, the third in-vehicle device may send the result of verification performed by the third in-vehicle device on the third verification information to the first in-vehicle device.

For another example, the fourth message may further carry a result of verification performed by the first in-vehicle device on the first verification information. For example, the result of verification performed by the first in-vehicle device on the first verification information is tag, and tag="success" or "not success (or failure)". In this way, the third in-vehicle device is implicitly indicated to send the result of verification on the third verification information to the first in-vehicle device.

Step 1003a: If the first in-vehicle device determines, based on the result of verification performed by the third in-vehicle device on the first data, that the result of verification performed by the third in-vehicle device on the first data is that the verification fails, the first in-vehicle device may determine that the second data is not abnormal and the first data is abnormal.

Step 1004a: The first in-vehicle device may restore, based on the second data, the first data stored in the second in-vehicle device to normal data. This may specifically include: The first in-vehicle device sends the second data to the second in-vehicle device; and the second in-vehicle device updates the first data based on the second data.

Step 1003b: If the result of verification performed by the third in-vehicle device on the first data is that the verification succeeds, it may be determined that the first data is not abnormal and the second data is abnormal.

Step 1004b: The first in-vehicle device may restore, based on the first data of the second in-vehicle device, the second data stored in the first in-vehicle device to normal data. This may specifically include: The second in-vehicle device sends the first data to the first in-vehicle device; and the first in-vehicle device updates the second data based on the first data.

For some specific implementation details of the steps in the procedures shown in FIG. 3 to FIG. 10, refer to related descriptions of the embodiment shown in FIG. 2.

In this embodiment of this application, configuration information of an in-vehicle device is stored on different in-vehicle devices. For example, the configuration information of the second in-vehicle device is stored on the first in-vehicle device. In this way, the first in-vehicle device may perform verification on the configuration information of the second in-vehicle device, and further, may perform authentication on the identity of the second in-vehicle device, to improve security of performing verification on the configuration information of the second in-vehicle device. In addition, to improve verification effectiveness, further verification may be performed by using another in-vehicle device. For example, if the second in-vehicle device fails to be verified by the first in-vehicle device, the first in-vehicle device may further perform verification by using the third in-vehicle device, which is equivalent to performing multiple verification. In this verification manner, verification reliability is improved, and abnormal data can be restored in a timely manner based on a verification result. This avoids a case in the current technology in which when an exception occurs, abnormal data can only be manually checked, which affects normal work of a vehicle. In this way, security of configuration information of the in-vehicle device is improved.

With reference to the accompanying drawings, the following describes a data verification apparatus configured to implement the foregoing methods in embodiments of this application. Therefore, all the foregoing content may be used in the following embodiments. Repeated content is not described again.

Figure 11:
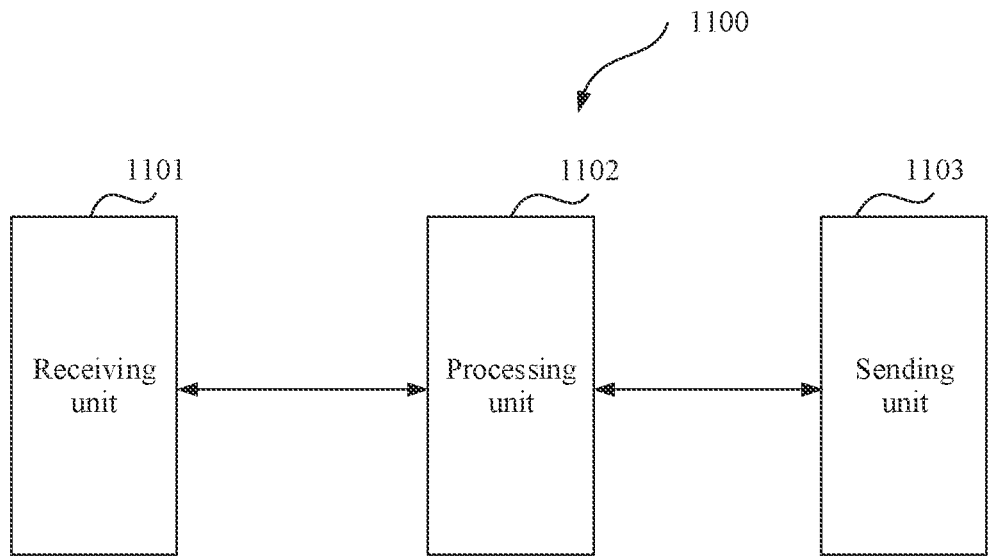
FIG. 11 is a diagram of a structure of a data verification apparatus according to an embodiment of this application.

Based on the foregoing method embodiments, an embodiment of this application further provides a data verification apparatus. The data verification apparatus is applied to a vehicle, and the vehicle includes a first in-vehicle device and a second in-vehicle device. The data verification apparatus may be configured to implement a data verification function of the first in-vehicle device in FIG. 2. The data verification apparatus may be the first in-vehicle device in the first aspect, a sub-apparatus in the first in-vehicle device, or may be an apparatus existing in the vehicle in a form independent of the first in-vehicle device. As shown in FIG. 11, the data verification apparatus 1100 includes a receiving unit 1101, a sending unit 1103, and a processing unit 1102. The following describes functions and relationships of each unit when the data verification apparatus 1100 performs data verification.

The receiving unit 1101 is configured to receive a first message from the second in-vehicle device. The first message includes first verification information, the first verification information is used to perform verification on first data, and the first data is configuration information of the second in-vehicle device that is stored in the second in-vehicle device.

The processing unit 1102 is configured to perform verification on the first data based on configuration information of the second in-vehicle device that is stored in the first in-vehicle device and the first verification information.

In a possible implementation, the configuration information of the second in-vehicle device is related to a location or a function of the second in-vehicle device in the vehicle.

In a possible implementation, the first message further includes first authentication information, the first authentication information is used to perform authentication on an identity of the second in-vehicle device, and the first authentication information is generated based on identity information of the second in-vehicle device. The processing unit 1102 is further configured to perform authentication on the identity of the second in-vehicle device based on the first authentication information.

In a possible implementation, before receiving the first message from the second in-vehicle device, the receiving unit 1101 is further configured to receive a second message from the second in-vehicle device. The second message includes the first authentication information, the first authentication information is used to authenticate the identity of the second in-vehicle device, and the first authentication information is generated based on the identity information of the second in-vehicle device.

The processing unit 1102 is further configured to determine, based on the first authentication information, that the identity of the second in-vehicle device is authenticated.

In a possible implementation, the vehicle further includes a third in-vehicle device. The processing unit 1102 is configured to: determine that the first verification information is successfully verified; obtain, by using the receiving unit 1101, a result of verification on the first data from the third in-vehicle device; and determine, based on the result of verification performed by the third in-vehicle device on the first data, that the first verification information is successfully verified by the third in-vehicle device.

In a possible implementation, the vehicle further includes a third in-vehicle device, and the third in-vehicle device stores configuration information of the second device. The processing unit 1102 is further configured to: determine, based on a result of verification performed by the first in-vehicle device on the first data, that the first data fails to be verified by the first in-vehicle device; determine, based on a result of verification performed by the third in-vehicle device on second data, that the second data is successfully verified by the third in-vehicle device, where the second data is the configuration information of the second in-vehicle device that is stored in the first in-vehicle device; and determine, based on the fact that the second data is successfully verified by the third in-vehicle device and the first data fails to be verified by the first in-vehicle device, that the first data is abnormal. The receiving unit 1101 is further configured to obtain the result of verification performed by the third in-vehicle device on the second data.

In a possible implementation, the sending unit 1103 is configured to send the second data to the second in-vehicle device, where the second data is used by the second in-vehicle device to update the first data.

In a possible implementation, the receiving unit 1101 is further configured to receive a verification feedback message that is of third verification information and that is sent by the second in-vehicle device. The third verification information is used by the third in-vehicle device to perform verification on the first data, and the third verification information is sent by the second in-vehicle device to the third in-vehicle device. The verification feedback message of the third verification information is received by the second in-vehicle device from the third in-vehicle device, and the verification feedback message includes the result of verification performed by the third in-vehicle device on the first data. The processing unit 1102 is configured to determine a result of verification on the first data based on the verification feedback message.

In a possible implementation, the vehicle further includes a third in-vehicle device, and the third in-vehicle device stores configuration information of the second device. The processing unit 1102 is further configured to: determine, based on the result of verification performed by the first in-vehicle device on the first data, that the first data fails to be verified by the first in-vehicle device; determine, based on the result of verification performed by the third in-vehicle device on the first data, that the first data is successfully verified by the third in-vehicle device; and determine, based on the fact that the first data is successfully verified by the third in-vehicle device and the first data fails to be verified by the first in-vehicle device, that the second data is abnormal, where the second data is the configuration information of the second in-vehicle device that is stored in the first in-vehicle device.

The receiving unit 1101 is further configured to obtain the result of verification performed by the third in-vehicle device on the first data.

In a possible implementation, the receiving unit 1101 is further configured to obtain the first data or the configuration information of the second device that is stored in the third in-vehicle device. The processing unit 1102 is further configured to update the second data based on the first data or the configuration information of the second device that is stored in the third in-vehicle device.

In a possible implementation, the sending unit 1103 is configured to send a fifth message to the second in-vehicle device. The fifth message includes fourth verification information. The third verification information is used to perform verification on third data of the first in-vehicle device. The third data is configuration information of the first in-vehicle device that is stored in the first in-vehicle device. The receiving unit 1101 is configured to obtain a result of verification that is on the fourth verification information and that is returned by the second in-vehicle device.

In a possible implementation, the first verification information is generated based on the first data and a first encryption key, and the first encryption key is an encryption key of the second in-vehicle device. The processing unit 1102 is specifically configured to perform verification on the first data based on a first decryption key stored in the first in-vehicle device. The first decryption key and the first encryption key are a key pair.

In a possible implementation, before the processing unit 1102 performs authentication on the identity of the second in-vehicle device based on the first authentication information, the sending unit 1103 is further configured to: send a first random number to the second in-vehicle device, where the first authentication information is generated by the second in-vehicle device by performing an operation on the first random number by using the first encryption key, and the first encryption key is the encryption key of the second in-vehicle device.

The processing unit 1102 is further configured to perform authentication on the first authentication information based on the first decryption key and the first random number, where the first decryption key and the first encryption key are a key pair.

In a possible implementation, the first authentication information further includes a public key infrastructure PKI certificate of the second in-vehicle device. The processing unit 1102 is further configured to perform authentication on the PKI certificate of the second in-vehicle device.

In a possible implementation, the processing unit 1102 is specifically configured to determine, based on a result of authentication on first identity information, that the identity of the second in-vehicle device fails to be authenticated by the first in-vehicle device; and determine, based on the fact that the identity of the second in-vehicle device fails to be authenticated by the first in-vehicle device, that the identity of the second in-vehicle device is abnormal.

It should be noted that, in the foregoing embodiments of this application, division into modules is an example, and is merely a logical function division. During actual implementation, there may be another division manner. In addition, function units in embodiments of this application may be integrated into one processing unit, or may exist alone physically, or two or more units are integrated into one unit. Only one or more of the foregoing units may be implemented by software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC).

When the integrated unit is implemented in the form of a software functional unit and sold or used as an independent product, the integrated unit may be stored in a computer-readable storage medium. Based on such understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods in embodiments of this application. The foregoing storage medium includes any medium that can store program code, such as a USB flash drive, a removable hard disk drive, a read-only memory (ROM), a random access memory (RAM), a magnetic disk, or an optical disc.

Figure 12:
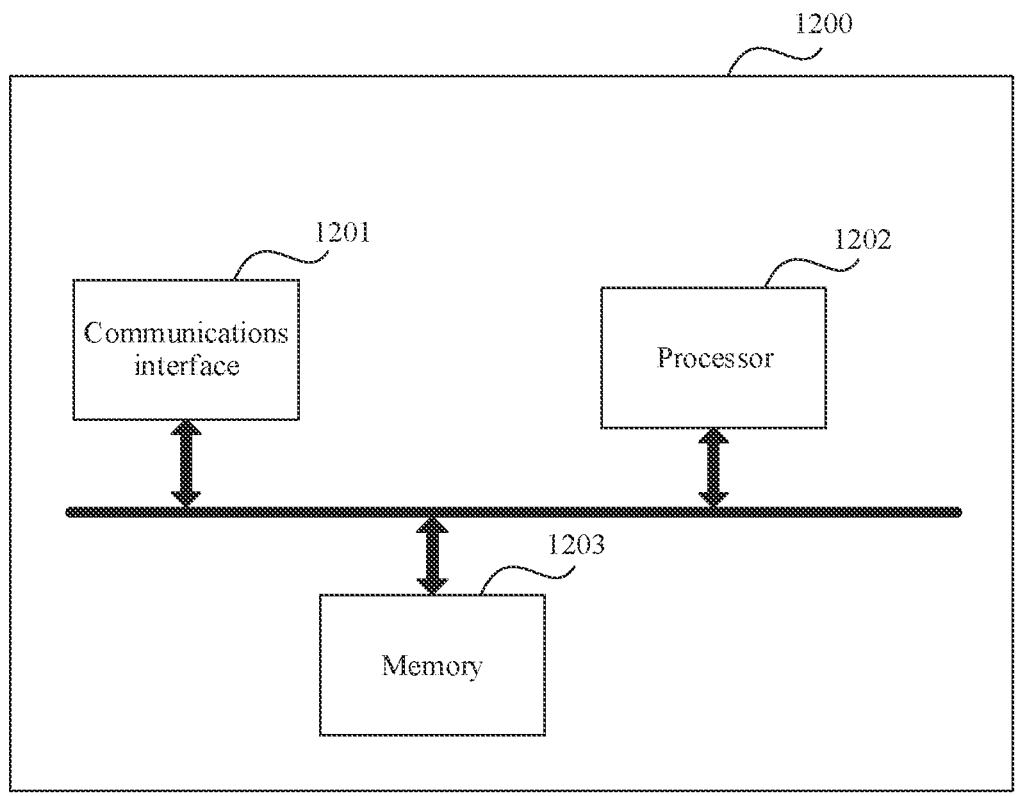
FIG. 12 is a diagram of a structure of a data verification apparatus according to an embodiment of this application.

Based on the foregoing embodiments, an embodiment of this application further provides a data verification apparatus. The data verification apparatus may complete data verification of the first in-vehicle device in FIG. 2 to FIG. 10. As shown in FIG. 12, the data verification apparatus 1200 includes a communications interface 1201, a processor 1202, and a memory 1203.

The communications interface 1201, the memory 1203, and the processor 1202 are connected to each other. Optionally, the communications interface 1201, the memory 1203, and the processor 1202 may be connected to each other by using a bus. The bus may be a peripheral component interconnect (PCI) bus, an extended industry standard architecture (EISA) bus, or the like. Buses may be classified into an address bus, a data bus, a control bus, and the like. For ease of representation, only one bold line is used to represent the bus in FIG. 12, but this does not mean that there is only one bus or only one type of bus.

The communications interface 1201 is configured to implement communication between the data verification apparatus and another component in a vehicle. For example, the communications interface 1201 may be configured to receive a first message from a second in-vehicle device, where the first message includes first verification information, the first verification information is used to perform verification on first data, and the first data is configuration information of the second in-vehicle device that is stored in the second in-vehicle device. The processor 1202 is configured to perform verification on the first data based on configuration information of the second in-vehicle device that is stored in the first in-vehicle device and the first verification information.

The processor 1202 may be further configured to implement the data verification solutions shown in FIG. 2 to FIG. 10. For details, refer to the descriptions in the embodiments shown in FIG. 2 to FIG. 10. Details are not described herein again. Optionally, the processor 1202 may be a central processing unit (CPU) or another hardware chip. The hardware chip may be an application-specific integrated circuit (ASIC), a programmable logic device (PLD), or a combination thereof. The PLD may be a complex programmable logic device (CPLD), a field-programmable logic gate array (field-programmable gate array, FPGA), a generic array logic (GAL), or any combination thereof. The processor 1202 may implement the foregoing functions by hardware or certainly by hardware executing corresponding software.

The memory 1203 is configured to store program instructions, data, and the like. Specifically, the program instructions may include program code, and the program code includes computer operation instructions. The memory 1203 may include a random access memory (RAM), or may include a non-volatile memory, for example, at least one magnetic disk memory. The processor 1202 executes a program stored in the memory 1203, and implements the foregoing functions by using the foregoing components, to finally implement the method provided in the foregoing embodiments.

Based on the foregoing embodiments, an embodiment of this application further provides a data verification system. The data verification system may include a data verification apparatus configured to implement a data verification function of the first in-vehicle device and a data verification apparatus configured to implement a data verification function of the second in-vehicle device that are shown in FIG. 11. The system may further include a data verification apparatus configured to implement a data verification function of the third in-vehicle device. The data verification system may further include the data verification apparatus shown in FIG. 12. The data verification apparatus may be the data verification apparatus that is shown in FIG. 12 and that is configured to implement a function of the first in-vehicle device, may be a sub-apparatus in the first in-vehicle device, or may be an apparatus that exists in the vehicle in a form independent of the first in-vehicle device. The data verification apparatus in this embodiment of this application may be a general-purpose device or a dedicated device. This is not specifically limited in this embodiment of this application. A related function of the data verification apparatus may be implemented by one device, or may be jointly implemented by a plurality of devices, or may be implemented by one or more functional modules in one device. This is not specifically limited in this embodiment of this application. It may be understood that the foregoing function may be an element in a hardware device, or may be a software function running on dedicated hardware, or a combination of hardware and software, or a virtualization function instantiated on a platform (for example, a cloud platform).

Based on the foregoing embodiments, an embodiment of this application further provides a computer program product. When the computer program product runs on a processor, the data verification apparatus is enabled to perform various possible methods provided in the foregoing embodiments.

Based on the foregoing embodiments, an embodiment of this application further provides a computer storage medium. The computer storage medium stores a computer program. When the computer program is executed by a processor, the data verification apparatus is enabled to perform various possible methods provided in the foregoing embodiments.

Based on the foregoing embodiments, an embodiment of this application further provides a chip. The chip is configured to read a computer program stored in a memory, to implement the method provided in the foregoing embodiments.

Based on the foregoing embodiments, an embodiment of this application further provides a chip system. The chip system includes a processor, configured to support a computer apparatus in implementing functions related to a terminal device in the method provided in the foregoing embodiments. In a possible design, the chip system further includes a memory, and the memory is configured to store a program and data that are used by the computer apparatus. The chip system may include a chip, or may include a chip and another discrete component.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Clearly, a person skilled in the art can make various modifications and variations to this application without departing from the protection scope of this application. This application is intended to cover these modifications and variations of this application provided that they fall within the scope of protection defined by the following claims and their equivalent technologies.

What is claimed is:

1. A first device in a vehicle, wherein the vehicle comprises the first device and a second device, the first device comprises at least one processor and at least one memory, and the at least one memory stores program instructions for execution by the at least one processor to cause the first device to:
    receive, by the first device, a first message from the second device, wherein the first message comprises first verification information, the first verification information is used to perform verification on first data, and the first data is configuration information of the second device that is stored in the second device; and
    perform, by the first device, verification on the first data based on configuration information of the second device that is stored in the first device and the first verification information, wherein performing, by the first device, the verification on the first data comprises:
    performing, by the first device, a first verification on the first data based on a digital key and the first verification information; and
    performing, by the first device, a second verification on integrity of the first data based on the configuration information of the second device that is stored in the first device.

2. The first device according to claim 1, wherein the first message comprises first authentication information, the first authentication information is used to perform authentication on an identity of the second device, the first authentication information is generated based on identity information of the second device, and the at least one memory stores the program instructions for execution by the at least one processor to:
    perform authentication on the identity of the second device based on the first authentication information.

3. The first device according to claim 1, wherein the at least one memory stores the program instructions for execution by the at least one processor to:
    receive a second message from the second device, wherein the second message comprises first authentication information, the first authentication information is used to perform authentication on an identity of the second device, and the first authentication information is generated based on identity information of the second device; and
    determine, based on the first authentication information, that the identity of the second device is authenticated.

4. The first device according to claim 1, wherein the vehicle further comprises a third device, the third device stores configuration information of the second device, and the at least one memory stores the program instructions for execution by the at least one processor to:
    determine, based on a result of verification performed on the first data, that the first data fails to be verified;
    obtain a result of verification performed by the third device on second data, wherein the second data is the configuration information of the second device that is stored in the first device;
    determine, based on the result of verification performed by the third device on the second data, that the second data is successfully verified by the third device; and
    determine, based on that the second data is successfully verified by the third device and the first data fails to be verified, that the first data is abnormal.

5. The first device according to claim 4, wherein the at least one memory stores the program instruction for execution by the at least one processor to:
    send the second data to the second device, wherein the second data is used to update the first data.

6. The first device according to claim 1, wherein the vehicle further comprises a third device, the third device stores configuration information of the second device, and the at least one memory stores the program instructions for execution by the at least one processor to:
    determine, based on a result of verification performed on the first data, that the first data fails to be verified;
    obtain a result of verification performed by the third device on the first data;
    determine, based on the result of verification performed by the third device on the first data, that the first data is successfully verified by the third device; and
    determine that second data is abnormal based on that the first data is successfully verified by the third device and the first data fails to be verified, wherein the second data is the configuration information of the second device that is stored in the first device.

7. The first device according to claim 6, wherein the at least one memory stores the program instruction for execution by the at least one processor to:
    obtain the first data or the configuration information of the second device that is stored in the third device; and
    update the second data based on the first data or the configuration information of the second device that is stored in the third device.

8. The first device according to claim 1, wherein the first verification information is generated based on the first data and a first encryption key, the first encryption key is an encryption key of the second device; and the at least one memory stores the program instructions for execution by the at least one processor to:

perform verification on the first data based on a first decryption key stored in the first device, wherein the first decryption key and the first encryption key are a key pair.

9. The first device according to claim 2, wherein the at least one memory stores the program instruction for execution by the at least one processor to:

send a first random number to the second device, wherein the first authentication information is generated by the second device by performing an operation on the first random number by using a first encryption key, and the first encryption key is an encryption key of the second device; and perform authentication on the first authentication information based on a first decryption key and the first random number, wherein the first decryption key and the first encryption key are a key pair.

10. The first device according to claim 9, wherein:

the first authentication information further comprises a public key infrastructure (PKI) certificate of the second device; and the at least one memory stores the program instruction for execution by the at least one processor to:
performing authentication on the PKI certificate of the second device.

11. The first device according to claim 9, wherein the at least one processor is coupled to the at least one memory stores the program instruction for execution by the at least one processor to:

determine, based on a result of authentication on the first authentication information, that the identity of the second device fails to be authenticated; and determine that the identity of the second device is abnormal based on that the identity of the second device fails to be authenticated.

12. A data verification method, wherein the data verification method is applied to a vehicle, the vehicle comprises a first in-vehicle device and a second in-vehicle device, and the data verification method comprises:

receiving, by the first in-vehicle device, a first message from the second in-vehicle device, wherein the first message comprises first verification information, the first verification information is used to perform verification on first data, and the first data is configuration information of the second in-vehicle device that is stored in the second in-vehicle device; and performing, by the first in-vehicle device, verification on the first data, based on configuration information of the second in-vehicle device that is stored in the first in-vehicle device and the first verification information, wherein performing, by the first in-vehicle device, the verification on the first data comprises:

performing, by the first in-vehicle device, a first verification on the first data based on a digital key and the first verification information; and performing, by the first in-vehicle device, a second verification on integrity of the first data based on the configuration information of the second in-vehicle device that is stored in the first in-vehicle device.

13. The data verification method according to claim 12, wherein:

the first message further comprises first authentication information, the first authentication information is used to perform authentication on an identity of the second in-vehicle device, and the first authentication information is generated based on identity information of the second in-vehicle device; and the data verification method further comprises:
performing, by the first in-vehicle device, authentication on the identity of the second in-vehicle device based on the first authentication information.

14. The data verification method according to claim 12, wherein before the receiving, by the first in-vehicle device, a first message from the second in-vehicle device, the data verification method further comprises:

receiving, by the first in-vehicle device, a second message from the second in-vehicle device, wherein the second message comprises first authentication information, the first authentication information is used to perform authentication on an identity of the second in-vehicle device, and the first authentication information is generated based on identity information of the second in-vehicle device; and determining, by the first in-vehicle device based on the first authentication information, that the identity of the second in-vehicle device is authenticated.

15. The data verification method according to claim 12, wherein:

the vehicle further comprises a third in-vehicle device, the third in-vehicle device stores configuration information of the second in-vehicle device; and the data verification method further comprises:
determining, by the first in-vehicle device based on a result of verification performed by the first in-vehicle device on the first data, that the first data fails to be verified by the first in-vehicle device;

obtaining, by the first in-vehicle device, a result of verification performed by the third in-vehicle device on second data, wherein the second data is the configuration information of the second in-vehicle device that is stored in the first in-vehicle device;

determining, by the first in-vehicle device based on the result of verification performed by the third in-vehicle device on the second data, that the second data is successfully verified by the third in-vehicle device; and determining, by the first in-vehicle device based on that the second data is successfully verified by the third in-vehicle device and the first data fails to be verified by the first in-vehicle device, that the first data is abnormal.

16. The data verification method according to claim 15, wherein the data verification method further comprises:

sending, by the first in-vehicle device, the second data to the second in-vehicle device, wherein the second data is used by the second in-vehicle device to update the first data.

17. The data verification method according to claim 12, wherein:

the vehicle further comprises a third in-vehicle device, the third in-vehicle device stores configuration information of the second in-vehicle device; and the data verification method further comprises:
determining, by the first in-vehicle device based on a result of verification performed by the first in-vehicle device on the first data, that the first data fails to be verified by the first in-vehicle device;

obtaining, by the first in-vehicle device, a result of verification performed by the third in-vehicle device on the first data;

determining, by the first in-vehicle device based on the result of verification performed by the third in-vehicle device on the first data, that the first data is successfully verified by the third in-vehicle device; and determining, by the first in-vehicle device, that second data is abnormal based on that the first data is successfully verified by the third in-vehicle device and the first data fails to be verified by the first in-vehicle device, wherein the second data is the configuration information of the second in-vehicle device that is stored in the first in-vehicle device.

18. The data verification method according to claim 12, wherein:

the first verification information is generated based on the first data and a first encryption key, and the first encryption key is an encryption key of the second in-vehicle device; and the performing, by the first in-vehicle device, verification on the first data comprises:
performing, by the first in-vehicle device, verification on the first data based on a first decryption key stored in the first in-vehicle device, wherein the first decryption key and the first encryption key are a key pair.

19. The data verification method according to claim 13, wherein before the performing, by the first in-vehicle device, authentication on the identity of the second in-vehicle device based on the first authentication information, the data verification method further comprises:

sending, by the first in-vehicle device, a first random number to the second in-vehicle device, wherein the first authentication information is generated by the second in-vehicle device by performing an operation on the first random number by using a first encryption key, and the first encryption key is an encryption key of the second in-vehicle device; and the performing, by the first in-vehicle device, authentication on the identity of the second in-vehicle device comprises:
performing, by the first in-vehicle device, authentication on the first authentication information based on a first decryption key and the first random number, wherein the first decryption key and the first encryption key are a key pair.

20. A non-transitory computer-readable medium applied to a first device in a vehicle, wherein the vehicle comprises the first device and a second device, and wherein the non-transitory computer-readable medium stores program instructions for execution by at least one processor to:

receive a first message from the second device, wherein the first message comprises first verification information, the first verification information is used to perform verification on first data, and the first data is configuration information of the second device that is stored in the second device; and perform verification on the first data based on configuration information of the second device that is stored in the first device and the first verification information, wherein performing the verification on the first data comprises:
performing a first verification on the first data based on a digital key and the first verification information; and
performing a second verification on integrity of the first data based on the configuration information of the second device that is stored in the first device.

* * * * *

UNITED STATES PATENT AND TRADEMARK OFFICE
CERTIFICATE OF CORRECTION

Page 1 of 1

PATENT NO. : 12,301,730 B2
APPLICATION NO. : 17/965455
DATED : May 13, 2025
INVENTOR(S) : Jianfen Peng and Zhipeng Guo It is certified that error appears in the above-identified patent and that said Letters Patent is hereby corrected as shown below:

In the Claims

In Column 46, In Line 3, In Claim 13, delete "in- vehicle" and insert -- in-vehicle --.

Signed and Sealed this
Ninth Day of September, 2025

Coke Morgan Stewart
*Acting Director of the United States Patent and Trademark Office*